US007630922B2

(12) United States Patent
Namba et al.

(10) Patent No.: US 7,630,922 B2
(45) Date of Patent: Dec. 8, 2009

(54) CONTENT DISTRIBUTION MANAGEMENT SYSTEM AND CONTENT DISTRIBUTION MANAGEMENT METHOD

(75) Inventors: Takaaki Namba, Nagoya (JP); Takashi Matsuo, Kawasaki (JP); Akio Higashi, Takatsuki (JP); Tohru Nakahara, Osaka (JP); Hiroki Murakami, Suita (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 10/073,204

(22) Filed: Feb. 13, 2002

(65) Prior Publication Data

US 2002/0111878 A1   Aug. 15, 2002

(30) Foreign Application Priority Data

Feb. 14, 2001   (JP)   ............................. 2001-036523

(51) Int. Cl.
    *G06F 17/30* (2006.01)
(52) U.S. Cl. ............................................. 705/27; 705/26
(58) Field of Classification Search ............. 705/26–27
    See application file for complete search history.

(56) References Cited

U.S. PATENT DOCUMENTS

| 5,794,207 A | | 8/1998 | Walker et al. | |
| 5,910,987 A | * | 6/1999 | Ginter et al. | ................... 705/52 |
| 6,385,596 B1 | * | 5/2002 | Wiser et al. | ................... 705/51 |

FOREIGN PATENT DOCUMENTS

| EP | 0 653 695 | 5/1995 |
| EP | 0 798 892 | 10/1997 |
| JP | 7-302244 | 11/1995 |
| JP | 2000-308129 | 11/2000 |

OTHER PUBLICATIONS

Fitzpatrick, Eileen; "IBM Unveils Super Distribution Application," Billboard, Feb. 3, 2001, v113n5p. 8, Proquest #67467333 3pgs.*
Matsushita: Quan, Margaret; "Software Secure Net Music," Electronic Engineering Times, Aug. 14, 2000, n1126p. 24, Proquest #58025894, 2pgs.*
Matsushita: "Matsushita Electric (Panasonic) and InterTrust to Collaborate on Secure Music Distribution," PR Newswire, Jan. 10, 2001, p. 1, Proquest #66453094, 3pgs.*
Von Faber et al., entitled "*The Secure Distribution of Digital Contents*", Computer Security Applications Conference, 1997. Proceedings., 13th Annual San Diego, CA, USA Dec. 8-12, 1997, Los Alamitos, CA, USA, IEEE Comput. Soc., US, Dec. 8, 1997, pp. 16-22.
Marc A. Kaplan, entitled "*IBM Cryptolopes, SuperDistribution and Digital Rights Management*", Dec. 30, 1996.
Lechner et al., entitled "*Communities—Business Models and System Architectures: The Blueprint of MP3.com, Napster and Gnutella Revisited*", Proceedings of the Hawaii International Conference on System Sciences, XX, XX, Jan. 3, 2001, pp. 2293-2302.

* cited by examiner

*Primary Examiner*—Robert M. Pond
(74) *Attorney, Agent, or Firm*—Wenderoth, Lind & Ponack, L.L.P.

(57) ABSTRACT

A content distribution management system includes a plurality of content distributing devices, which each include a content storage processing unit operable to store and distribute a content, a user interface unit operable to provide viewing and information of a content for a user, a content acquisition processing unit operable to acquire a content from a content providing device, etc. and to perform purchase processing of the content, and a sending/receiving unit operable to exchange data via a communication network. The content distribution management system also includes a content distribution management device, which includes a payment management processing unit operable to perform payment processing of a content, and a copyright management processing unit operable to manage and send copyright-related information (a usage rule, key information, etc.). The content distributing devices and the content distribution management system are configured via the communication network, etc.

5 Claims, 16 Drawing Sheets

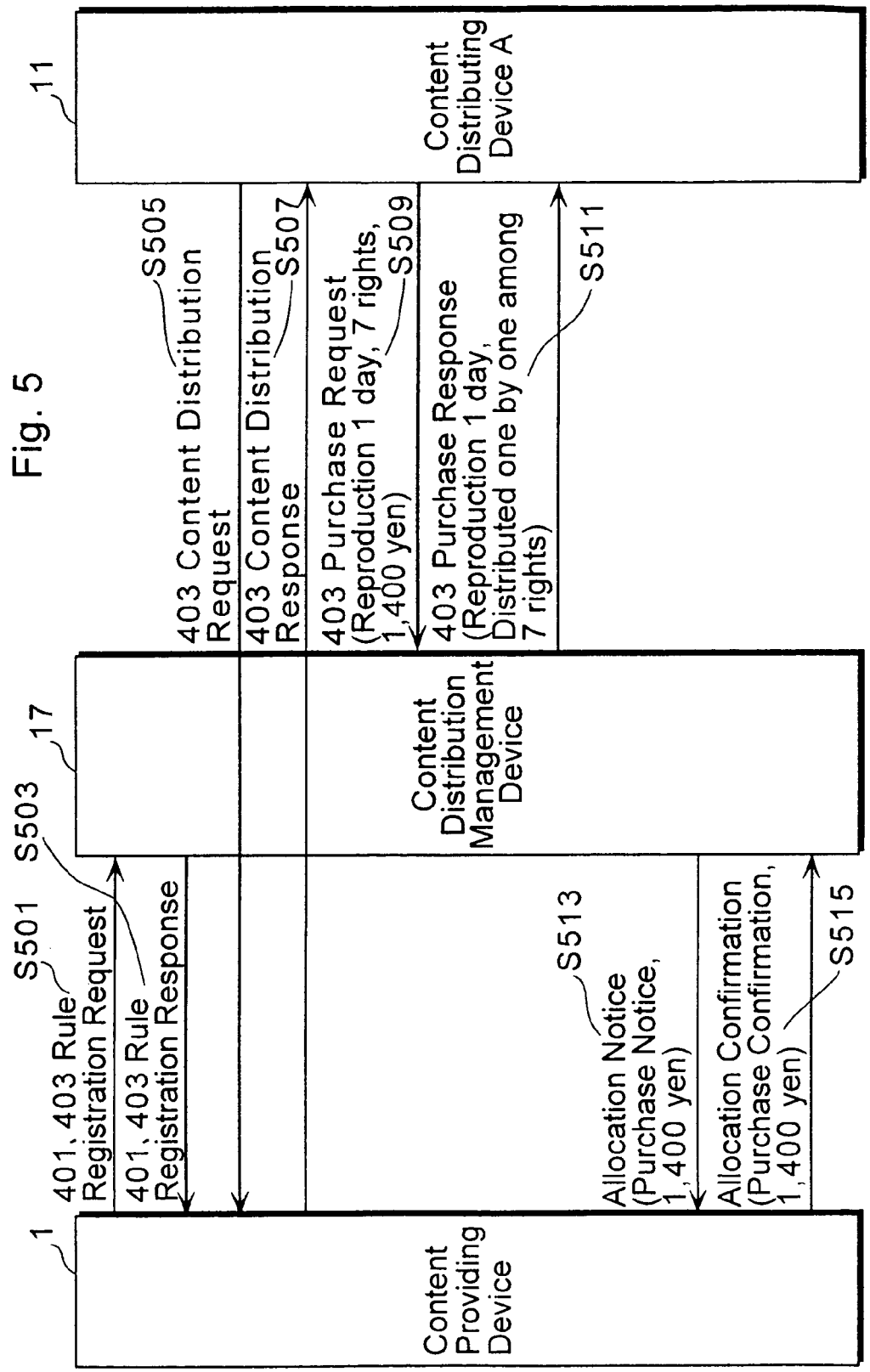

Fig. 6A

| Content Name (ContentID) | Address/Port of Distributor | Key Information | UsageRules | | | Payment Information | Intermediary Allocation Rate (non-purchased) | Management Fee | Advertising rate |
|---|---|---|---|---|---|---|---|---|---|
| | | | Reproduction Right | Moving Control Right | Number of Rights | | | | |
| 401 — Content A | Content Providing Device/21 | xxx | Reproduction 1day | Disabled | 7,000 | ¥1000/7rights | ¥2/right[0.2%] | ¥1/7 rights | ¥1/time |
| 403 — Content A | Content Providing Device/21 | yyy | Reproduction 1day | Enabled | 100,000 | ¥200/right | ¥1/right[0.5%] | ¥1/right | ¥1/time |

Fig. 6B

| Content Name (ContentID) | Address/Port of Distributor | Key Information | UsageRules | | | Payment Information | Intermediary Allocation Rate (non-purchased) | Management Fee | Advertising rate |
|---|---|---|---|---|---|---|---|---|---|
| | | | Reproduction Right | Moving Control Right | Number of Rights | | | | |
| 401 — Content A | Content Providing Device/21 | xxx | Reproduction 1day | Disabled | 7,000 | ¥1000/7rights | ¥2/right[0.2%] | ¥1/7 rights | ¥1/time |
| 403 — Content A | Content Providing Device/21 | yyy | Reproduction 1day | Enabled | 99,993 | ¥200/right | ¥1/right[0.5%] | ¥1/right | ¥1/time |
| 411 — Content A | Content Distributing DeviceA/21 | zzz | Reproduction 1day | Enabled | 7 | Not for Sale | — | — | — |

Fig. 6C

| Content Name (ContentID) | Address/Port of Distributor | Key Information | UsageRules | | | Payment Information | Intermediary Allocation Rate (non-purchased) | Management Fee | Advertising rate |
|---|---|---|---|---|---|---|---|---|---|
| | | | Reproduction Right | Moving Control Right | Number of Rights | | | | |
| 401 — Content A | Content Providing Device/21 | xxx | Reproduction 1day | Disabled | 7,000 | ¥1000/7rights | ¥2/right[0.2%] | ¥1/7 rights | ¥1/time |
| 403 — Content A | Content Providing Device/21 | yyy | Reproduction 1day | Enabled | 99,993 | ¥200/right | ¥1/right[0.5%] | ¥1/right | ¥1/time |
| 411 — Content A | Content Distributing DeviceA/21 | zzz | Reproduction 1day | Enabled | 3 | Not for Sale | — | — | — |

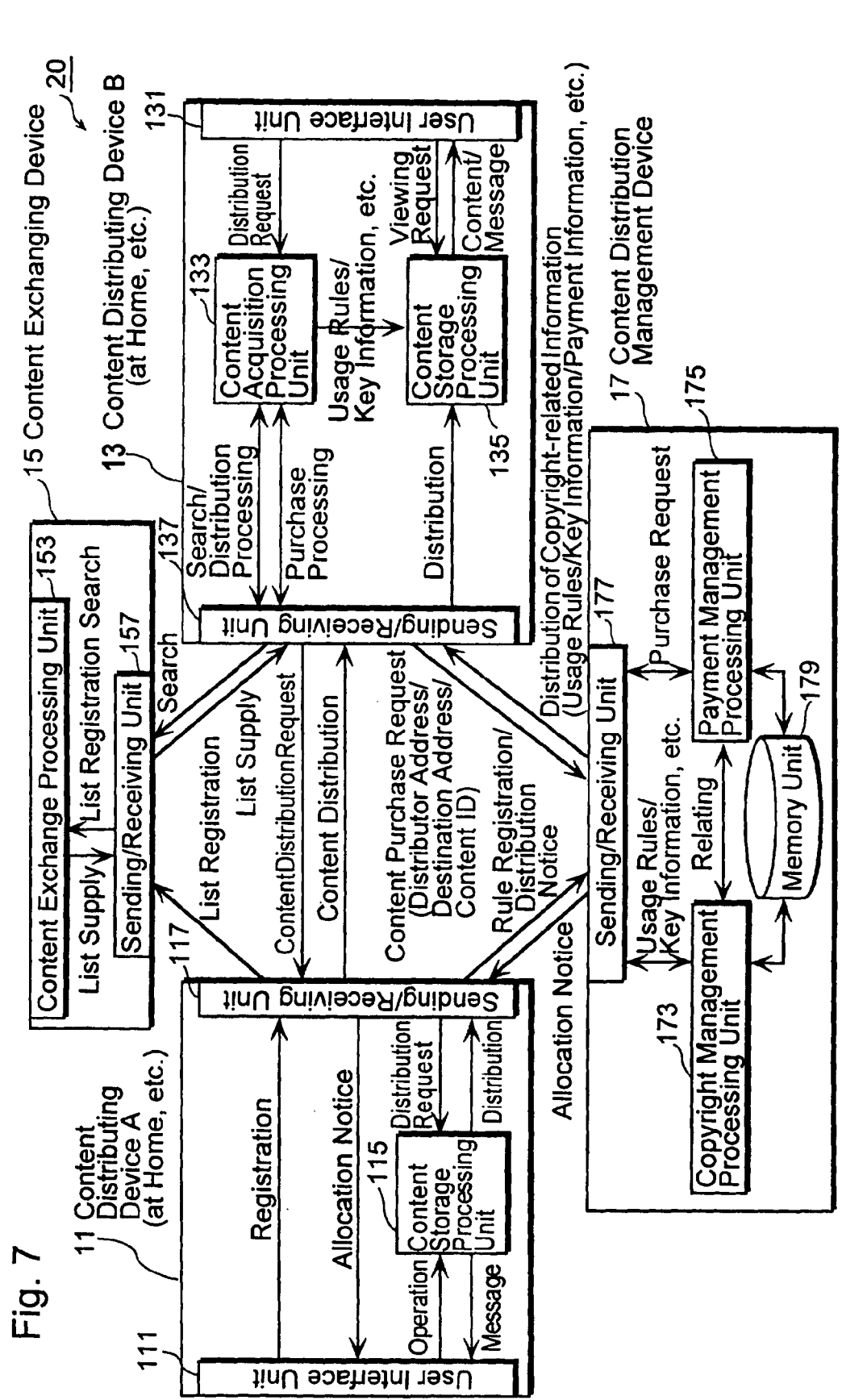

Fig. 10A

| Content Name (ContentID) | Address/Port of Distributor | Key Information | Usage Rules - Reproduction Right | Usage Rules - Moving Control Right | Usage Rules - Number of Rights | Payment Information | Intermediary Allocation Rate (non-purchased) | Management Fee |
|---|---|---|---|---|---|---|---|---|
| 601 Content A | Content Providing Device/21 | x x x | Reproduction 1 day | Enabled | 7,000 | ¥1000/rights | ¥2/right[0.2%] | ¥1/7 rights |
| 603 Content A | Content Providing Device/21 | y y y | Reproduction 1 day | Enabled | 10,000,000 | ¥200/right | ¥1/right[0.5%] | ¥1/ right |

Fig. 10B

| Content Name (ContentID) | Address/Port of Distributor | Key Information | Usage Rules - Reproduction Right | Usage Rules - Moving Control Right | Usage Rules - Number of Rights | Payment Information | Intermediary Allocation Rate (non-purchased) | Management Fee |
|---|---|---|---|---|---|---|---|---|
| 601 Content A | Content Providing Device/21 | x x x | Reproduction 1 day | Enabled | 6,993 | ¥1000/rights | ¥2/right[0.2%] | ¥1/7 rights |
| 603 Content A | Content Providing Device/21 | y y y | Reproduction 1 day | Enabled | 10,000,000 | ¥200/right | ¥1/right[0.5%] | ¥1/ right |
| 611 Content A | Content Distributing Device A/21 | z z z | Reproduction 1 day | Enabled | 7 | Not for Sale | — | — |

Fig. 10C

| Content Name (ContentID) | Address/Port of Distributor | Key Information | Usage Rules | | | Payment Information | Intermediary Allocation Rate (non-purchased) | Management Fee |
|---|---|---|---|---|---|---|---|---|
| | | | Reproduction Right | Moving Control Right | Number of Rights | | | |
| 601 — Content A | Content Providing Device/21 | x x x | Reproduction 1day | Enabled | 6,993 | ¥1000/7rights | ¥2/right[0.2%] | ¥1/7 rights |
| 603 — Content A | Content Providing Device/21 | y y y | Reproduction 1day | Enabled | 10,000,000 | ¥200/right | ¥1/right[0.5%] | ¥1/ right |
| 611 — Content A | Content Distributing Device A/21 | z z z | Reproduction 1day | Enabled | 3 | ¥180/right | ¥2/right[1.1%] | — |

Fig. 10D

| Content Name (ContentID) | Address/Port of Distributor | Key Information | Usage Rules | | | Payment Information | Intermediary Allocation Rate (non-purchased) | Management Fee |
|---|---|---|---|---|---|---|---|---|
| | | | Reproduction Right | Moving Control Right | Number of Rights | | | |
| 601 — Content A | Content Providing Device/21 | x x x | Reproduction 1day | Enabled | 6,993 | ¥1000/7rights | ¥2/right[0.2%] | ¥1/7 rights |
| 603 — Content A | Content Providing Device/21 | y y y | Reproduction 1day | Enabled | 10,000,000 | ¥200/right | ¥1/right[0.5%] | ¥1/ right |
| 661 — Content A | Content Distributing Device A/21 | z z z | Reproduction 1day | Enabled | 2 | ¥180/right | ¥2/right[1.1%] | — |
| 671 — Content A | Content Distributing Device B/21 | v v v | Reproduction 1day | Enabled | 1 | Not for Sale | — | — |

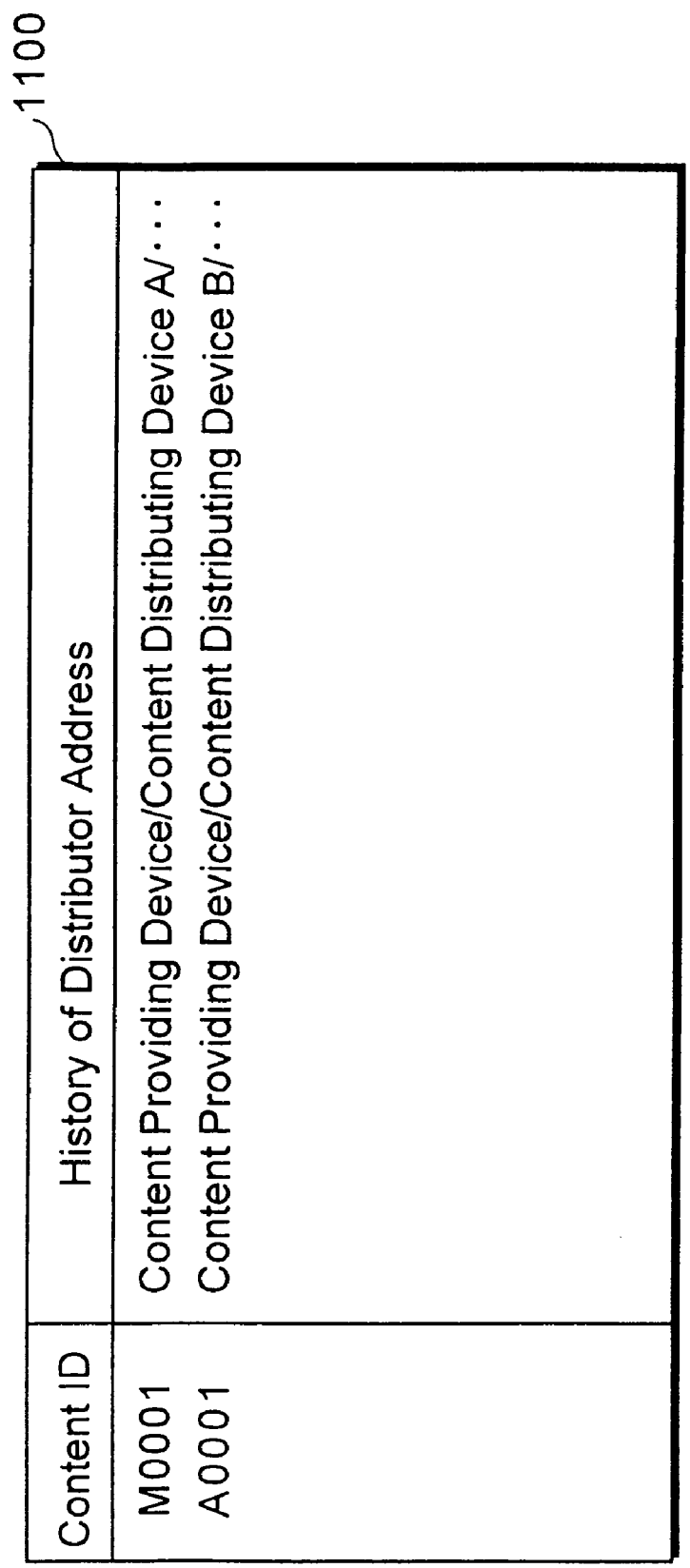

Fig. 13A

| Content Name (ContentID) | Address/Port of Distributor | Key Information | Usage Rules | | | Payment Information | Intermediary Allocation Rate (non-purchased) | Management Fee |
|---|---|---|---|---|---|---|---|---|
| | | | Reproduction Right | Moving Control Right | Number of Rights | | | |
| 701 — Content A | ContentProvidingDevice/21 | xxx | Reproduction 1 day | Disabled | 7,000 | ¥1000/7rights | ¥2/right[0.2%] | ¥1/7 rights |
| 703 — Content A | ContentProvidingDevice/21 | yyy | Reproduction 1 day | Enabled | 100,000 | ¥200/right | ¥1/right[0.5%] | ¥1/ right |

Fig. 13B

| Content Name (ContentID) | Address/Port of Distributor | Key Information | Usage Rules | | | Payment Information | Intermediary Allocation Rate (non-purchased) | Management Fee |
|---|---|---|---|---|---|---|---|---|
| | | | Reproduction Right | Moving Control Right | Number of Rights | | | |
| 701 — Content A | ContentProvidingDevice/21 | xxx | Reproduction 1 day | Disabled | 7,000 | ¥1000/7rights | ¥2/right[0.2%] | ¥1/7 rights |
| 703 — Content A | ContentProvidingDevice/21 | yyy | Reproduction 1 day | Enabled | 99,999 | ¥200/right | ¥1/right[0.5%] | ¥1/ right |
| 711 — Content A | ContentDistributingDeviceB/21 | zzz | Reproduction 1 day | Enabled | 1 | Not for Sale | — | — |

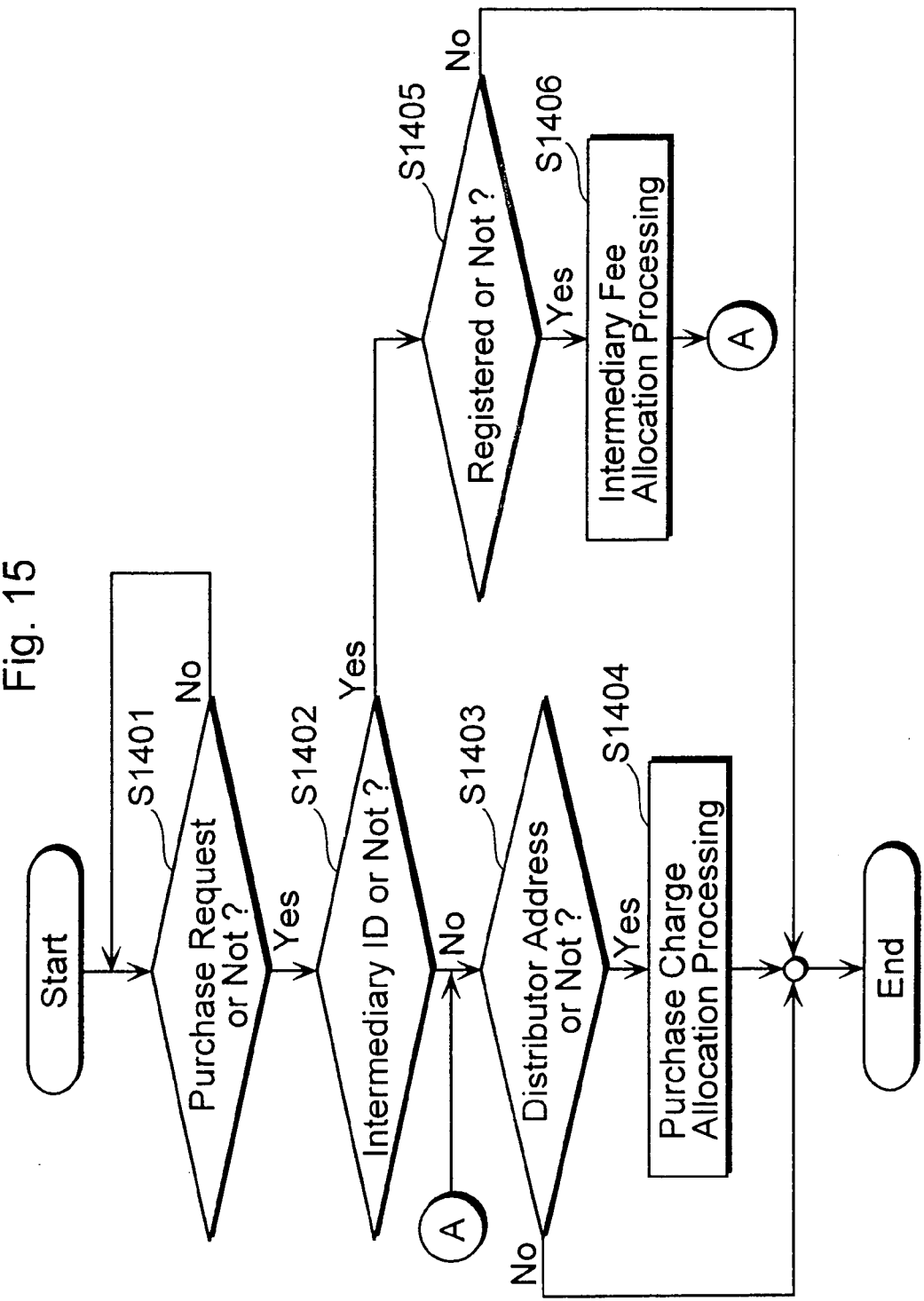

CONTENT DISTRIBUTION MANAGEMENT SYSTEM AND CONTENT DISTRIBUTION MANAGEMENT METHOD

BACKGROUND OF THE INVENTION (1) Field of the Invention

The present invention relates to a content distribution management system, and especially relates to a content distribution management system for managing copyrights and payments in connection with a content circulation.

(2) Description of the Prior Art

As a conventional method of downloading a desired content over a network such as the Internet or the like, a user requests a search server over the network to search contents by using key words or the like. Further, a user specifies a more desirable content from among the searched contents, requests the distributor of the content to distribute it, and acquires the requested content. Also, a user exchanges a file directly with another user or copies it by way of file exchange software, not through a server of a content provider, whether legitimately or otherwise.

Also, as seen in the U.S. Pat. No. 5,794,207, "Method and apparatus for a cryptographically assisted commercial network system designed to facilitate buyer-driven conditional purchase offers" owned by Walker Asset Management Limited Partnership (the so-called "Priceline patent"), there is a computer transaction system by a reverse auction in which a buyer offers a conditional purchase including a proposed price, inputs his/her credit card information into a computer, and selects the most appropriate seller from among potential sellers whom an intermediary invited.

However, the conventional file exchange system such as "Napster" or "Gnutella" provides no protection of content copyrights, that is, no payment processing. Therefore, there may be the case where a content is distributed free of charge, contrary to the copyright owner's intention.

SUMMARY OF THE INVENTION

Accordingly, the present invention is available to solve the above-mentioned problems. Thus, an object of the present invention is to provide a system for distributing a content efficiently, as well as avoiding copyright infringements which are caused by an illegitimate file exchange, and for managing the copyrights (or usage rules) of the content and payment processing. In other words, the present invention aims at preventing copyright infringements which are caused by an illegitimate file exchange or the like by building a system for performing copyright management concerning a content usage and payment management accompanying a content usage independently of distribution of an encrypted content. Also, the present invention aims to make sure that the copyright infringements of a content are prevented by performing the above-mentioned copyright management and payment management even when a part of usage rights of a purchased content is further sold to others, or when a content which only an intermediary distributed is purchased.

In order to achieve the above-mentioned object, the content distribution management system according to the present invention is a content distribution management system that circulates a content via a network, including a plurality of communication terminal devices that can exchange a content on a network, and a distribution management device that performs copyright management of a content and payment management concerning usage of the content. The communication terminal device includes a content receiving unit operable to receive a content from another communication terminal device, a purchase requesting unit operable to send purchase requesting information for requesting purchase of the received content to the distribution management device, and a right information receiving unit operable to receive, from the distribution management device, right information for enabling usage of the content which is requested to be purchased under a certain rule. The distribution management device includes a memory unit operable to memorize information regarding the copyright management and information regarding the payment management by relating the information with an individual content, a right information sending unit operable to specify right information according to the information regarding the copyright management that is specified based on the purchase requesting information which is received from the communication terminal device and to send the specified right information to a predetermined communication terminal device, and a payment management processing unit operable to update the information regarding the copyright management and the information regarding the payment management based on the purchase requesting information.

Therefore, since the distribution management device exclusively performs copyright management concerning usage of a content and payment management concerning purchase of a content based on right information and purchase requesting information, separately from distribution of the content, copyright infringements which are caused by an illegitimate file exchange or the like can be prevented.

Also, the content distribution management system according to the present invention further includes a communication exchange device that provides information regarding the circulation of the content to the communication terminal device. The communication terminal device further includes a search requesting unit operable to send information regarding a search to the communication exchange device, to receive result information regarding a predetermined search from the communication exchange device, and to specify a content and a distributor of the content based on the received result information. The communication terminal device also includes a distribution requesting unit operable to send, to the specified distributor, sending requesting information for requesting sending of the specified content. The communication exchange device includes a search responding unit operable to receive information regarding a search from the communication terminal device, to make a result information regarding the search based on the received information, and to send the result information to the communication terminal device that is a sender of the information regarding the search.

Therefore, since a user of the communication terminal device can obtain a search result corresponding to information regarding the search from the communication exchange device, the user can specify a content which meets his/her demands and a distributor of the content by using the information regarding the search.

Also, the communication terminal device according to the present invention includes a redistributing unit operable to send the content which is received by the content receiving unit to another communication terminal device.

Therefore, since a user of the communication terminal device can freely redistribute the received content to a user of another communication terminal device, the content can be circulated prevailingly.

Also, in the communication terminal device according to the present invention, the distribution requesting unit specifies the communication terminal device itself that makes the request or another communication terminal device as a destination of the specified content, and sends the sending requesting information to the specified device.

Therefore, since a content can be distributed to anyone different from a purchaser of the content, the content can be distributed as a gift.

Also, in the communication terminal device according to the present invention, the search requesting unit sends a search condition to the communication exchange device, receives a predetermined search list from the communication exchange device, and specifies a content and a distributor of the content based on attribute information indicating a characteristic of the content that is attached to the received search list.

Here, in the communication terminal device according to the present invention, the search requesting unit may further weight the attribute information, compare contents based on the attribute information, and specify a most weighted content and a distributor of the content.

Further, a content and a distributor of the content may be specified based on attribute information such as a data size of the content and a time which is required for distribution of the content, or an image format or a data compression method of the content.

Therefore, since a user of the communication terminal device can compare contents by weighting the attribute information, the user can specify a content that meets his/her demands more closely and a distributor of the content.

Also, in the distribution management device according to the present invention, the payment management processing unit may further make a history of information regarding the purchase of the content, and perform payment processing for allocating a charge based on the information of the history.

Also, in the distribution management device according to the present invention, the memory unit may further memorize information indicating a communication terminal device corresponding to information indicating an intermediary, and the payment management processing unit may further distinguish whether or not the information indicating an intermediary is added to the purchase requesting information that is received from the communication terminal device. When the information is added, the payment management processing unit may further perform payment processing concerning an intermediary fee allocation for the communication terminal device that is equivalent to the intermediary.

Also, in the distribution management device according to the present invention, the payment management processing unit, when the information regarding the copyright management is updated according to the purchase of a content, may further perform payment processing concerning collection of a management fee for the management for at least one of the communication terminal device that provides the content corresponding to the update, the communication terminal device that intermediates the content and the communication terminal device that purchases the content.

Therefore, since the distribution device can keep track of a purchase of a content according to the purchase history of the content, allocate an intermediary fee to an intermediary involved in the purchase of the content, and collect a management fee for the management of the purchase of the content, a more careful payment processing can be realized.

Also, the distribution management device according to the present invention may further include an advertising information storage unit operable to receive advertising information from one of the communication terminal devices, and to store the advertising information and information indicating the communication terminal device by relating the information with each other. The right information sending unit further reads out advertising information corresponding to the one communication terminal device from the advertising information storage unit, when the purchase requesting or usage requesting information of the content is received from the other communication terminal device, and sends the advertising information as well as the right information to the other communication terminal device. The payment management processing unit further performs payment processing concerning collection of an advertising rate for the one communication terminal device.

Therefore, the communication terminal device can place an advertisement, and the distribution management device can collect an advertising rate from the communication terminal device that placed the advertisement.

Note that, in order to achieve the above-mentioned object, the present invention can be realized as a content distribution management method including characteristic units of the above content distribution management system as steps, as a content usage method and a distribution management method including characteristic units of the above communication terminal device and the above distribution management device as steps, or as a program including each of these steps. Further, the program can not only be stored on a ROM or the like of the communication terminal device or the distribution management device, but can also be circulated via a transmission medium such as a recording medium like a CD-ROM or the like and a communication network.

BRIEF DESCRIPTION OF THE DRAWINGS

These and other objects, advantages and features of the invention will become more apparent from the following detailed description when taken in conjunction with the accompanying drawings which illustrate specific embodiments of the invention.

FIG. 5 is a diagram showing a detailed example of information which is communicated between each device with a content distribution management device as a center in connection with a primary circulation of a content.

FIG. 6A is an example of a table in use for managing copyrights and payment (before purchase of a content).

FIG. 6B is an example of a table in use for managing copyrights and payments (after purchase of a content).

FIG. 6C is an example of a table in use for managing copyrights and payments (after usage of 4 rights of a content).

FIG. 7 is a block diagram showing a functional configuration of each device in a content distribution management system according to the second embodiment, in which how communication is performed between each device in a secondary circulation of a content is illustrated.

FIG. 10A is an example showing how details of a management information table which is managed in a content distribution management device change in the case where a content is purchased in a primary circulation and further circulated secondarily (before purchase of a content).

FIG. 10B is an example showing how details of a management information table which is managed in a content distribution management device change in the case where a content is purchased in a primary circulation and further circulated secondarily (after purchase of a content).

FIG. 10C is an example showing how details of a management information table which is managed in a content distribution management device change in the case where a content is purchased in a primary circulation and further circulated secondarily (in the case where 4 rights of a content are used and then the remaining 3 rights are offered for sale).

FIG. 10D is an example showing how details of a management information table which is managed in a content distribution management device change in the case where a content is purchased in a primary circulation and further circulated secondarily (after purchase of a content in a secondary circulation).

FIG. 11 is an example of a table showing a circulation history of a content.

FIG. 13A is an example showing how details of a management information table which is managed in a content distribution management device change in the case where a non-purchased content is secondarily circulated (before purchase of a content).

FIG. 13B is an example showing how details of a management information table which is managed in a content distribution management device change in the case where a non-purchased content is secondarily circulated (after purchase of a content).

FIG. 15 is a flowchart showing a flow of allocation processing among payment processing in a content distribution management device.

DETAILED DESCRIPTION OF THE PREFERRED EMBODIMENT

The following is an explanation of the embodiments for the present invention with reference to the drawings.

The First Embodiment

Figure 1:
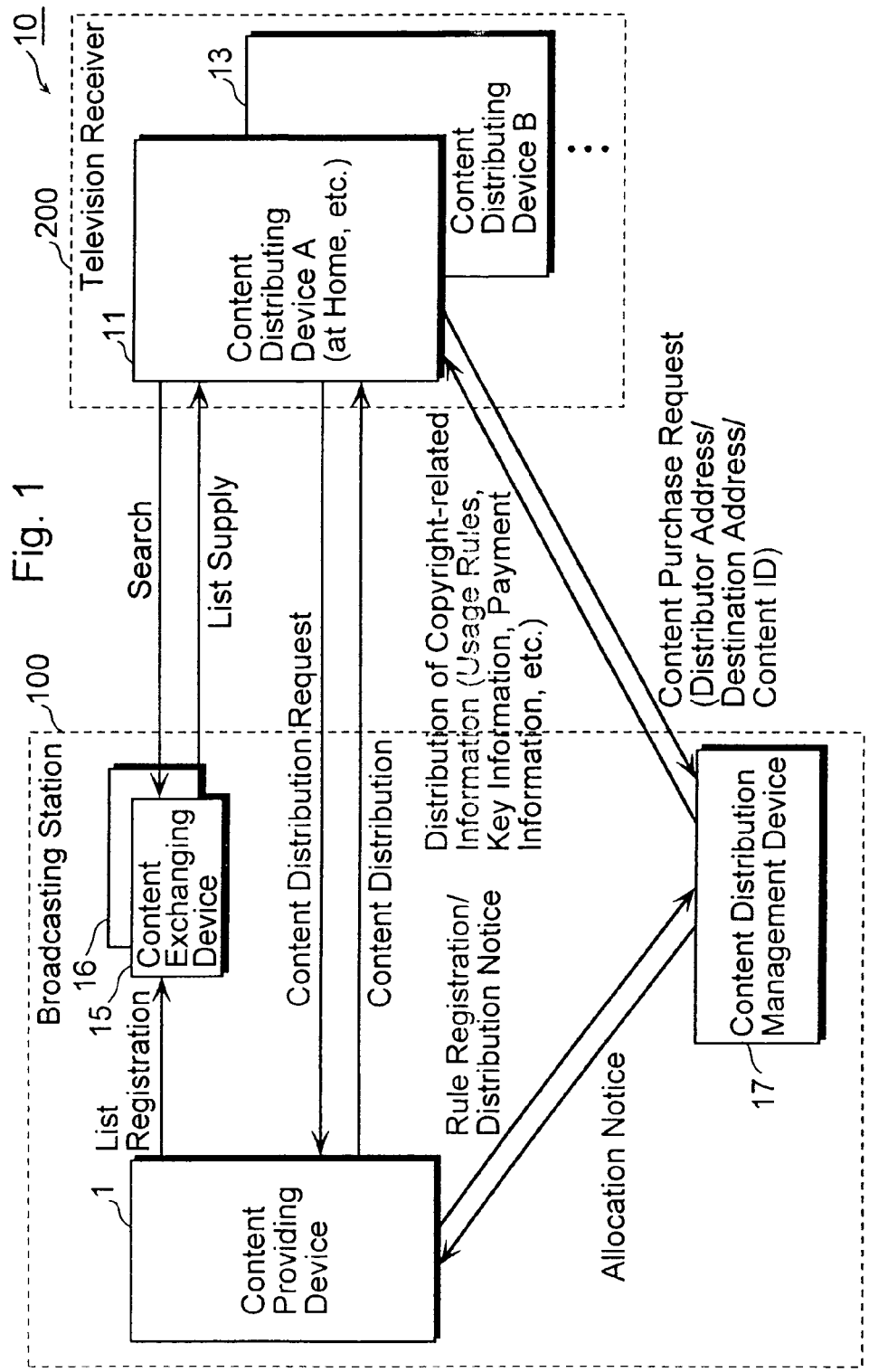
FIG. 1 is a diagram showing a relationship between a broadcasting station and a TV receiver in a configuration example of a content distribution management system, in which how communication is performed in a primary circulation of a content is illustrated.

FIG. 1 is a diagram showing a relationship between a broadcasting station 100 and a TV receiver 200 in a configuration example of a content distribution management system 10 of the first embodiment, in which how communication is performed in a primary circulation of a content is illustrated.

More specifically, the broadcasting station 100 is a BS/CS digital broadcasting station or the like having a content providing device 1, content exchanging devices 15, 16 and a content distribution management device 17. The TV receiver 200 is a content distributing device(s) A 11, B 13 or the like.

Also, there may be the case where the content providing device 1 corresponds to the broadcasting station 100 on the Internet, and where the content distributing device A 11 or B 13 corresponds to a personal computer, an STB (a set-top box) or the like at home.

Here, "a primary circulation" means a delivery of a content by a user who is entitled to delivery rights of the content (an original creator, most typically). In this primary circulation, there are two cases where a recipient of the delivery purchases the content, or receives only the distribution of the content without purchasing the content. Further, "a secondary circulation" means a re-delivery of the content that was circulated primarily. Here, re-delivery of the content that was purchased in the primary circulation is referred to as "resale", and re-delivery of the content that was not purchased but distributed in the primary circulation is referred to as "intermediation".

The primary circulation of a content will be outlined with reference to FIG. 1.

First, the content providing device 1 registers usage rules and others of a distributable content on the content distribution management device 17. Further, the content providing device 1 registers a list describing information of the distributable content on the content exchanging device 15.

The content distribution device A 11 requests the content exchanging device 15 to search for desired contents, and receives a supply of a content list from the content exchanging device 15. The content distributing device A 11 thereby specifies the content providing device 1 and a content based on the content list, requests the content providing device 1 to distribute the specified content, and receives distribution of the content. At this time, the content providing device 1 may notify the content distribution management device 17 that the content providing device 1 has distributed the content to the content distributing device A 11.

Further, the content distributing device A 11 requests the content distribution management device 17 to purchase the distributed content in order to purchase it, and receives a distribution of usage rules, an encryption key and copyright information such as payment information to enable its use. Here, in requesting to purchase a content, an address of a content providing device as a distributor, an address of a device to which the content, usage rules, encryption key and copyright information is to be distributed, as a destination (the content distributing device A 11 in this case), content ID and others are specified.

Then, the content distribution management device 17 notifies the content providing device 1 that a payment was allocated because of the purchase of the content which is entitled to the content providing device 1.

Note that a network in this case includes a broadcasting network or a communication network.

Figure 2:
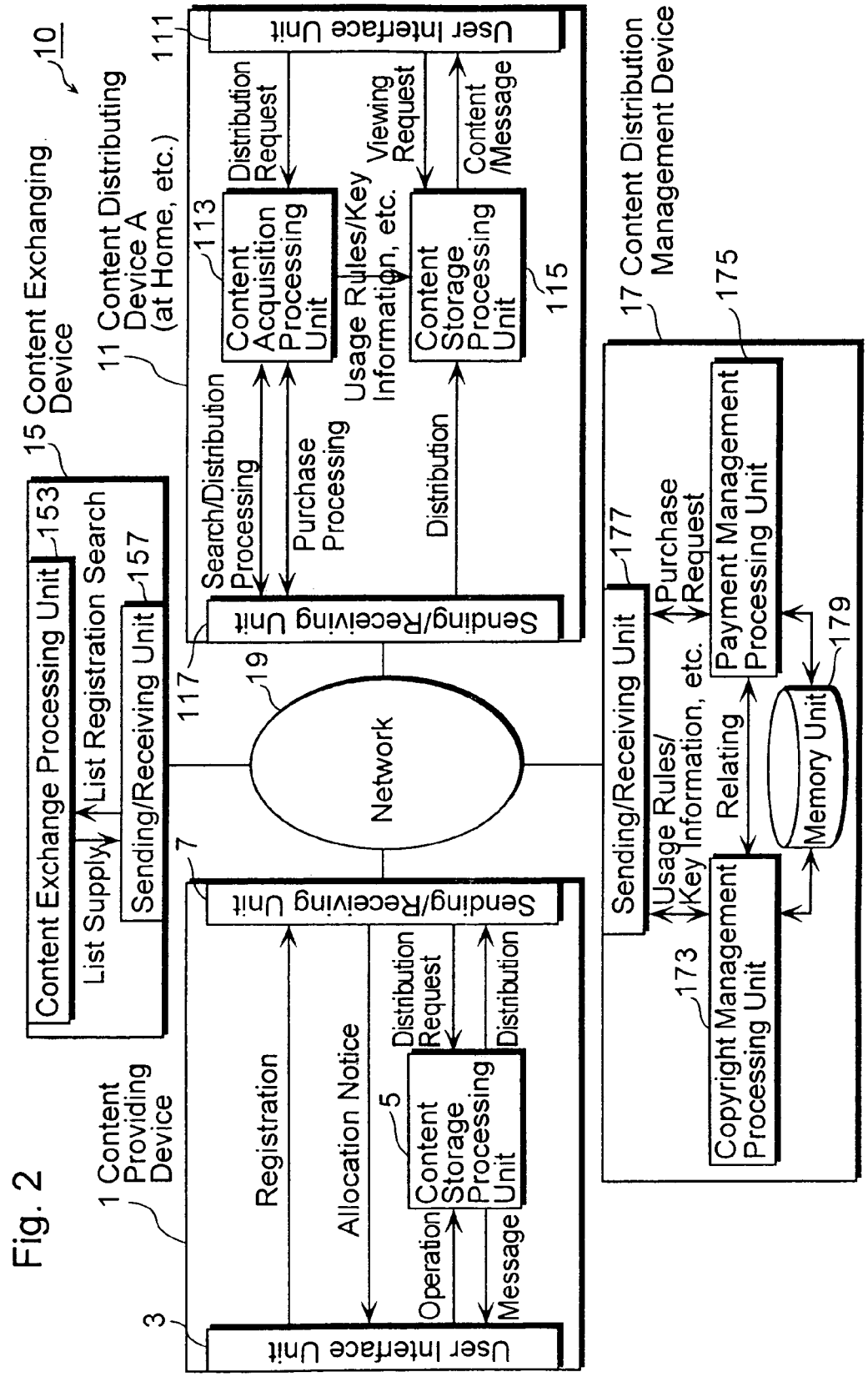
FIG. 2 is a block diagram showing a functional configuration of each device as shown in FIG. 1.

FIG. 2 is a block diagram showing a functional configuration of each device as shown in FIG. 1.

The content providing device 1 includes a content storage processing unit 5 for managing storage and distribution of a content such as audio/video or data, a user interface unit 3 for communicating usage of a content (e.g., control of viewing a content and transferring/copying a content; same meaning as above thereafter) and information thereof, and a sending/receiving unit 7 for sending and receiving a content or the like to and from other devices via a network 19. Note that, although the content providing device 1 actually requires, in addition to the above, various components for realizing a security protection function, a format conversion function, an encryption/decryption function, and a digital broadcasting sending/receiving function or a communication function, they are omitted because they are not the main features of the present invention.

The content distributing device A 11 includes a content storage processing unit 115 for managing the storage and usage of a content such as audio/video or data, a user interface unit 111 for communicating usage and information of a content, a content acquisition processing unit 113 for acquiring and purchasing the most appropriate content based on copyright-related information (such as usage rules and others), and a sending/receiving unit 117 for sending and receiving a content or the like to and from other devices via the network 19. Note that, although the content distributing device A 11 actually requires, in addition to the above, various components for realizing a security protection function, a format conversion function, an encryption/decryption function, and a digital broadcasting sending/receiving function or a communication function, they are omitted because they are not the main features of the present invention.

The content exchanging device 15 includes a content exchange processing unit 153 for searching contents which are requested by the content distributing device A 11 and providing a list of them, and a sending/receiving unit 157 for sending and receiving a content or the like to and from other devices via a broadcast wave (such as a BS wave or a ground wave, specifically) or a communication network. Note that, although the content exchanging device 15 actually requires, in addition to the above, various components for realizing a database management function and a digital broadcasting sending/receiving function or a communication function, they are omitted because they are not the main features of the present invention.

The content distribution management device 17 includes a payment management processing unit 175 for managing payments of a content which is requested by the content distributing device A 11 and allocating a payment to a content provider (the content providing device 1), and a copyright management processing unit 173 for managing and notifying copyright-related information (such as usage rules and a key for encrypting/decrypting a content). Note that, although the content distribution management device 17 actually requires, in addition to the above, various components for realizing a database managing function and a digital broadcasting sending/receiving function or a communication function, they are omitted because they are not the main features of the present invention.

Figure 3:
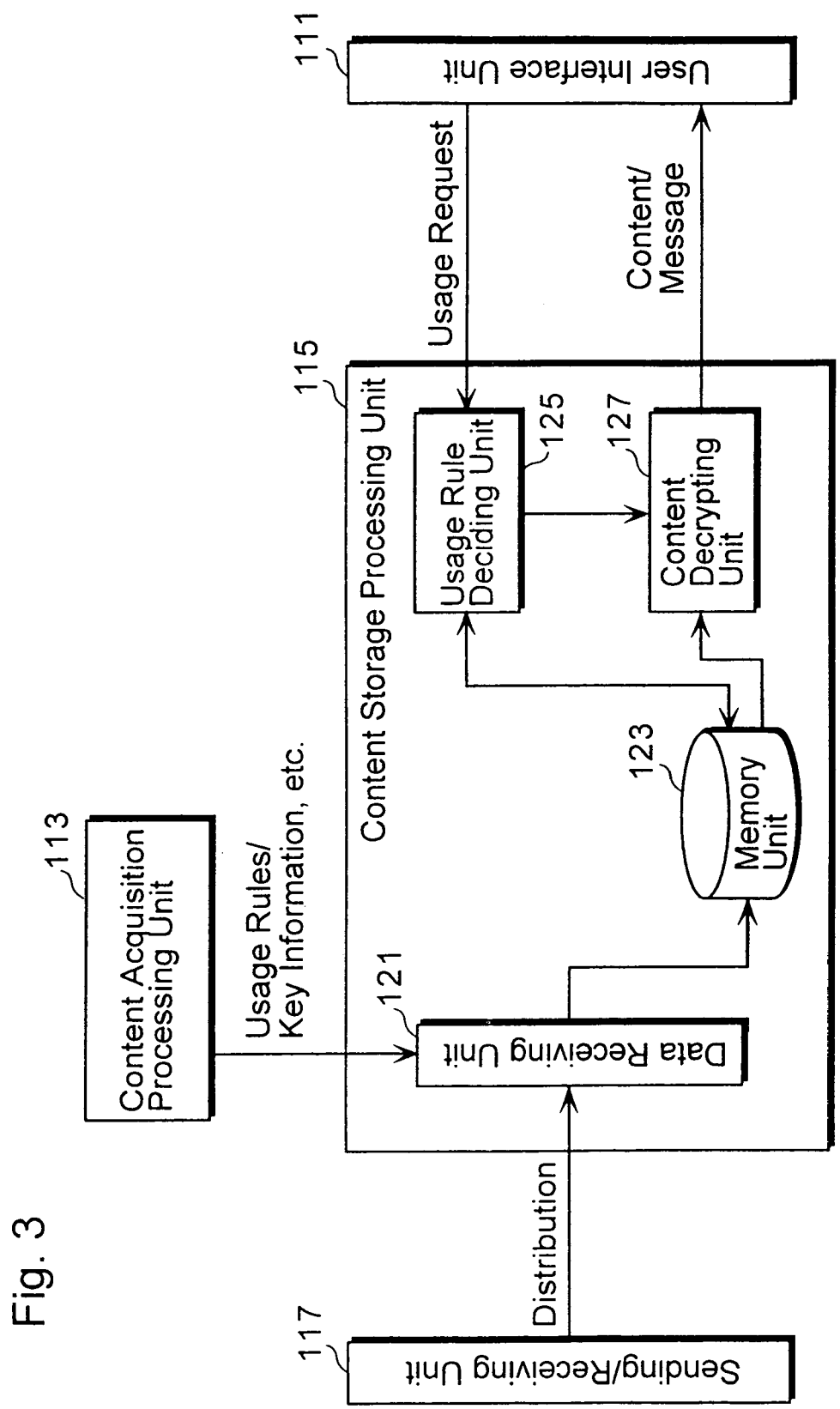
FIG. 3 is a detailed functional block diagram of a content storage processing unit of a content distributing device A as shown in FIG. 2.

FIG. 3 is a detailed functional block diagram of the content storage processing unit 115 of the content distributing device A 11 as shown in FIG. 2. As shown in FIG. 3, the content storage processing unit 115 includes a data receiving unit 121, a memory unit 123, a usage rule deciding unit 125 and a content decrypting unit 127.

The data receiving unit 121 stores an encrypted content which is received from the sending/receiving unit 117 into the memory unit 123. Further, the data receiving unit 121 stores usage rules, key information and others which are received from the content acquisition processing unit 113 into the memory unit 123.

The data receiving unit 121 stores an encrypted content, usage rules, key information and others in the memory unit 123, which is a magnetic disk with a capacity of tens to several hundreds gigabytes, for example.

The usage rule deciding unit 125 refers to the usage rules which are stored in the memory unit 123 so as to decide whether or not it is possible to view or use the content. Further, the usage rule deciding unit 125 updates details of usage rules in accordance with a view or use of a content.

Note that the usage rule deciding unit 125 makes a decision of usage rules only when the above-mentioned content distribution management device 17 devolves upon it (many number of rights are purchased, for example).

The content decrypting unit 127 decrypts an encrypted content by using key information which is stored in the memory unit 123, when it is possible to view or use the content, and sends the decrypted content to the user interface unit 111.

Next, operations of the system 10 will be explained with reference to the drawings.

Figure 4:
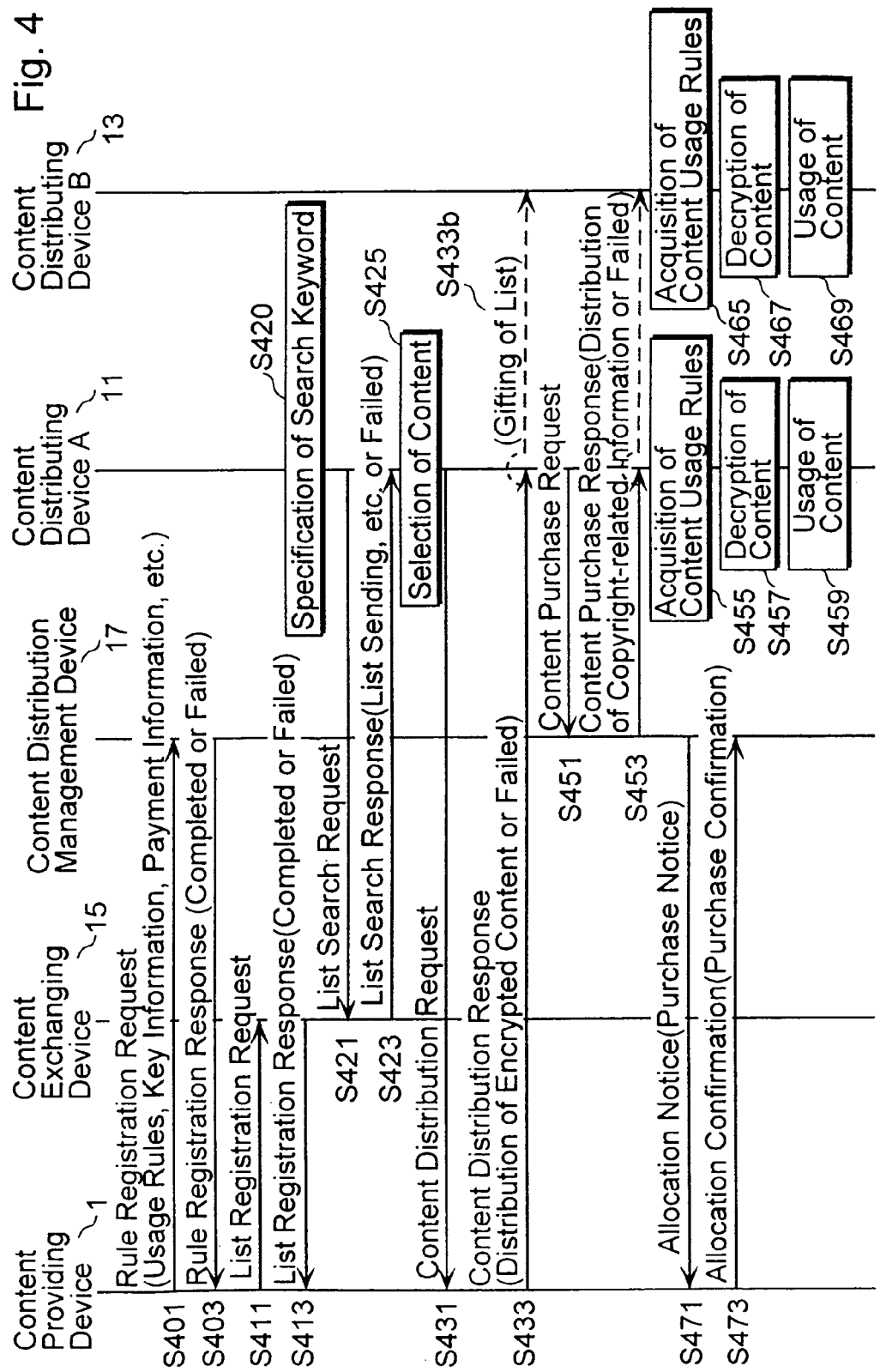
FIG. 4 is a diagram of a communication sequence between each device in the case of a primary circulation of a content.

FIG. 4 is a diagram of a communication sequence between each device in the case of a primary circulation of a content. Processing concerning a primary circulation of a content is performed as follows. The content distributing device A 11 receives distribution of a content from the content providing device 1 via the content exchanging device 15. Then, the content distribution management device 17 manages the purchase, usage and so on of the content in the content distributing device A 11.

A primary circulation of a content which is performed by the system 10 will be explained below with reference to FIG. 4, FIG. 5 and FIGS. 6A-6C.

Here, FIG. 5 is a diagram showing a detailed example of information which is communicated between each device (the content exchanging device 15 is omitted) with the content distribution management device 17 as a center in connection with a primary circulation of a content.

Also, a management information table 400 in FIG. 6A, which is a table that is used for managing copyrights and payments per content, is stored in a memory unit 179 of the content distribution management device 17. In the management information table 400, information such as a name of a content (or an ID of a content) which is subject to payment management, an address and a port number of a distributor device, key information that is used for encryption and decryption of a content, copyright-related information including details of reproduction rights, enabling/disabling of moving control rights and number of rights, payment information, an intermediary allocation rate, a management fee, an advertising rate and others are registered.

Although something like "a content providing device" is described here for convenience as details of "an address of a distributor" in the management information table 400, a URL on the Internet such as "www.xxx.co.jp/con_server/" is actually registered (same as above hereinafter).

Note that, in addition to the above information, content-related information concerning content distribution such as a license of copy control, a content distribution time which is estimated based on a content size (depending upon a compression ratio) and a network band (it is possible, in this case, to shorten a time which is required for distribution of a content even via a network with a same band if a smaller size of a content is selected), quality of a content (it is possible, in this case, to obtain a content which matches a user's preferences or environments, for example, good or bad quality of an image depending upon a video format such as an HDTV (High Definition TV) or an SDTV (Standard Definition TV), or a difference of reproducibility depending upon a data compression method such as a JPEG, an MPEG or the like), printing and processing may be stored in the management information table 400, and therefore, it is possible to select a content which is to be viewed and used based on the above information.

Further, FIGS. 6B and 6C show how the details of the management information table 400 change in accordance with the purchase and usage of a content by the content distributing device A 11.

(1) The content providing device 1 sends a rule registration request to the content distribution management device 17 via the network 19 in order to register usage rules of a content which is distributable to a content distributing device (Step S401). At this time, the content providing device 1 sends key information, usage rules, payment information, etc. per content name, as shown in the management information table 400 in FIG. 6A, for example. This corresponds to the processing of a 401, 403 rule registration request (Step S501) in FIG. 5.

(2) The content distribution management device 17 checks details of the rule registration request which is received from the content providing device 1. As a result of the check, when the content distribution management device 17 decides that the rule registration request is unacceptable, the content management device 17 sends a rule registration response of "failed" to the content providing device 1 (Step S403). When the content providing device 1 receives the rule registration response "failed", a user tracks down the factors of the problem of contributing to the "failed" response and takes the appropriate measures, and then the processing of the above (1) and the following is re-performed.

(3) On the other hand, when the content distribution management device 17 decides that the rule registration request which is received from the content providing device 1 is acceptable, the content management device 17 sends a rule registration response of "completed" to the content providing device 1 (Step S403). When the content providing device 1 receives the rule registration response "completed", the content providing device 1 performs the processing as shown in (4) below and the following. This corresponds to the processing of a 401, 403 rule registration response (Step S503) in FIG. 5.

(4) The content providing device 1 sends a list registration request to the content exchanging device 15 via the network 19 in order to register information which is required for a search for selecting a content which is to be distributed to a user (Step S411). In this case, the information such as usage rules, payment information and others is sent per content name, as shown in the management information table 400 in FIG. 6A, for example, similar to the above-mentioned "rule registration request".

Note that the content exchanging device 15 may be either one unit for the whole system or plural units as shown in FIG. 1, (where two units of the content providing devices 15, 16 are shown). If plural devices exist, the content providing device 1 selects any of the plural devices based on any information (such as the duration of a search time). The content providing device 1 may, of course, select only one of the content exchanging devices or, alternately, more than one of the content exchanging devices.

(5) The content exchanging device 15 checks details of the list registration request which is received from the content providing device 1. As a result of the check, when the content exchanging device 15 decides that the list registration request is unacceptable, the content exchanging device 15 sends a list registration response of "failed" to the content providing device 1 (Step S413). When the content providing device 1 receives the list registration response "failed", a user tracks down the factors of the problem contributing to the "failed" response and takes the appropriate measures, and then the processing of the above (4) and the following is re-performed.

(6) When the content exchanging device 15 decides that the list registration request which is received from the content providing device 1 is acceptable, the content exchanging device 1 sends a list registration response "completed" to the content providing device 1 (Step S413). When the content providing device 1 receives the list registration response "completed", the content providing device performs the processing as shown in (7) below and the following.

(7) The content distributing device A 11 specifies a search keyword ("content A" or the like as a content name, for example) (Step S420), and sends a list search request to the content exchanging device 15 (Step S421) in order to request a search of a content which is desirable to be acquired via the network 19 and a list of the search results.

(8) The content exchanging device 15 checks details of the list search request which is received from the content distributing device A 11. As a result of the check, when the content exchanging device 15 decides that the list search request is unacceptable, the content exchanging device 15 sends a list search response of "failed" to the content distributing device A 11 (Step S423). When the content distributing device A 11 receives the list search response "failed", a user tracks down the factors of the problem contributing to the "failed" response and takes the appropriate measures, and then the processing of the above (7) and the following is re-performed.

(9) If the content exchanging device 15 decides that the list search request received from the content distributing device A 11 is acceptable, the content exchanging device 15 sends a list search response of "completed" as well as a list of the search results to the content distributing device A 11 (Step S423). When the content distributing device A 11 receives the list and the list search response "completed", the content distributing device A11 performs the processing as shown in (10) below and the following.

(10) The content distributing device A 11 selects a content that meets desired usage rules from among the received list (and thereby, a distributor device of this content is specified). At this time, the content distributing device A 11 sets weighting factors corresponding to the degree of closeness to the desired usage rules, and selects a content having the biggest value which is obtained by multiplying weighting factors of respective usage rules. In FIG. 6A, for example, assume that a user of the content distributing device A 11 makes a keyword search by using a key word "content A" as a "content name", and as a result, a content A 401 and a content A 403 of the content providing device 1 are listed. In this case, if the user desires rental reproduction for 7 days (in this case, the weighting factors of a "reproduction right" as a usage rule of the content A 401 and the content A 403 are set to be 10, respectively), a movable content (in this case, the weighting factors of a "moving control right" of the content A 401 and the content A 403 are set to be 0 and 10, respectively), and a cheapest content as possible (in this case, the weighting factors of "payment information" of the content A 401 and the content A 403 are set to be 7 and 5, respectively), the content A 403 has a bigger value which is obtained by multiplying respective weighting factors is to be selected (the values obtained by multiplying the above-mentioned weighting factors of the content A 401 and the content A 403 are 0 and 500, respectively). Note that it may be configured so that the above processing for selecting a content be performed in the content exchanging device 15.

(11) The content distributing device A 11 sends a content distribution request to the content providing device 1 in order to receive the distribution of the content A 403 which is selected in the above-mentioned processing (10) (Step S431). This corresponds to the processing of a 403 content distribution request (Step S505) in FIG. 5. The content distributing device A 11 usually requests the content providing device 1 to distribute a content to the content distributing device A 11 itself. However, a user of the content distributing device A 11 can specify another device (the content distributing device B 13, for example) than the device that made the request (that is, the content distributing device A 11) as a device to be distributed, because a device to distribute and a device to be distributed as well as a content are specified when a content distribution request is made (Step S433B). In other words, it becomes possible to distribute a content as a gift.

(12) The content providing device 1 checks details of the content distribution request which is received from the content distributing device A 11. As a result of the check, when the content providing device 1 decides that the content distribution request is unacceptable, the content providing device 1 sends a content distribution response of "failed" to the content distributing device A 11 (Step S433, Step S507). When the content distributing device A 11 receives the content distribution response of "failed", a user tracks down the factors of the problem of contributing to the "failed" response and takes the appropriate measures, and then the above-mentioned processing of (11) and the following are re-performed.

(13) When the content providing device 1 decides that the content distribution request which is received from the content distribution device A 11 is acceptable, the content providing device 1 sends a content distribution response of "completed" as well as a non-purchased encrypted content to the content distributing device A 11 (Step S433). In FIG. 5, this corresponds to the processing of a 403 content distribution response (Step S507) in FIG. 5. When the content distributing device A 11 receives the content distribution response of "completed", the content distributing device A11 performs the processing as shown in (14) below and the following.

Note that, in FIG. 4, the case where a content is distributed from the content providing device 1 to the content distributing device B 13 as a gift is shown by dashed lines.

(14) The content distributing device A 11 sends a content purchase request to the content distribution management device 17 in order to purchase a content based on a user's operation which is accepted via the user interface unit 131 (Step S451). This corresponds to the processing of a 403 purchase request (reproduction 1 day, 7 rights, 1,400 yen) (Step S509) in FIG. 5.

Note that, in a content purchase request, it is possible to select a combination of plural usage rules or any of the details of copyright-related information as each usage rule. Thereby, even if a request to use a content in a new manner arises and a content distributing device meeting this request is produced, it is possible to extend the system of the present invention flexibly by adding a new function for usage rule processing to a content distributing device as a distributor (a content providing device in the present invention). Note that when the content distributing device A 11 distributes a non-purchased content, that is, it intermediates a content, the following processing (15)-(17) is not performed.

(15) The content distribution management device 17 checks the details of the content purchase request which is received from the content distributing device A 11. As a result of the check, when the content distribution management device 17 decides that the content purchase request is unacceptable, the content distribution management device 17 sends a content purchase response of "failed" to the content distributing device A 11. When the content distributing device A 11 receives the content purchase response "failed", a user tracks down the factors of the problem contributing to the "failed" response and takes the appropriate measures, and then the above processing of (14) and the following is performed.

(16) When the content distribution management device 17 decides that the content purchase request which is received from the content distributing device A 11 is acceptable, the content distribution management device 17 updates the details of the management information table 400 stored in the memory unit 179 of the content distribution management device 17, and sends a content purchase response of "completed" as well as copyright-related information to the content distributing device A 11 (Step S453). This corresponds to the processing of a 403 purchase response (reproduction 1 day, distributed one by one among 7 rights) (Step S511) in FIG. 5. When the content distributing device A 11 receives the purchase response "completed" and so on, the content distributing device A11 performs the processing of (17) below and the following.

More specifically, in order to clarify to whom the copyrights of a part of (although a part of the content is to be purchased in an example of FIG. 6, the whole content can be purchased depending upon details of the purchase) the content A 403 is entitled, a new column is added, and necessary information is diverted from the column of the content A 403 or newly registered. In the example of FIG. 6B, since the reproduction rights for 7 days are purchased for the content A 403, the number of rights of the content A 403 is revised from "100,000" to "99,993" and the number of rights of a new added content A 411 is described as "7". Further, the "address of distributor" of the content A 411 is revised from "content providing device" to "content distributing device A". Note that since a content is purchased in this example, "payment information" of the content A 411 is described as "not for sale", and "intermediary allocation rate", "management fee" and "advertising rate" are described "as "- - - (no description) ", respectively. Also, as for the key information of the content A 411 "zzz", which is different from the key information of the content A 403 "yyy", is received from the content distribution management device 17 and described.

Further, the content distribution management device 17 acquires 1 yen, for example, as a management fee for right movement from the content providing device 1 or the content distributing device A 11 so as to make a profit. Note that as a business of the owner of the content distribution management device 17, he/she may, instead of or in addition to acquiring the above management fee, add an advertisement such as an e-mail to a content purchase response so as to acquire an advertising income from an advertiser. In the case of the content A 403 in the examples of FIGS. 6A-6C, the owner acquires 1 yen of an advertising rate for one addition of the advertisement, regardless of the advertisement style.

When a user of the content distributing device A 11 exercises reproduction rights for 4 days of a content after he/she purchases the content, the number of rights on the management information table 400 is revised from "7" to "3" by a copyright management processing unit 173 of the content distribution management device 17, as shown in a column of the content A 411 in FIG. 6C. When the reproduction rights are exercised, the content distributing device A 11 makes a license request to the content distribution management device 17 every time the reproduction right is subsequently exercised. The content distribution management device 17 decides the licensing based on the remaining number of reproduction rights and sends back the license response. The content distributing device A 11 receives the license response (including usage rules) and then the user views the content.

Note that when a user of the content distributing device A 11 purchases many (1,000, for example) number of rights, it is troublesome to make a license request to the content distribution management device 17 every time of the purchase. In such a case, it can be controlled so that the number of rights is decremented every time the usage rule deciding unit 125 reproduces the content while the purchased number of rights is stored in the memory 123 of the content distributing device A 11. In this case, the user of the content distributing device A 11 prohibits access to the number of rights that are stored in the memory unit 123.

Note that as to the copyright-related information, the usage rules are distributed from the content distribution management device 17 to the content distributing device A 11 in a minimum unit (any of 1-time use or control free, 1-time use or control disabled, and 1-time use or only-1-time control, for example). However, if the content was purchased under the rule of 1-time use or control free, the content is used or controlled without making a license request. As a result, the content distributing device A 11 to which the usage rules are distributed decides the minimum unit of the usage rules only and performs the processing.

(17) The content distribution management device 17 sends a distribution notice (a purchase notice) to the content providing device 1. Thereby, it is notified that the rights to use which are stored by the content providing device 1 were moved to another device (Step S471). This corresponds to the processing of an allocation notice (a purchase notice, 1,400 yen) (Step S513) in FIG. 5.

(18) When the content providing device 1 receives the allocation notice (purchase notice) from the content distribution management device 17, the content providing device 1 sends an allocation confirmation (a purchase confirmation) to the content distribution management device 17 (Step S473). This corresponds to the processing of an allocation confirmation (a purchase confirmation, 1,400 yen) (Step S515) in FIG. 5.

As described above, the system for performing copyright management and payment management concerning the copyrights independently upon distribution of an encrypted content in a content distribution management device is built, and thereby it becomes possible to prevent copyright which are infringements caused by an illegitimate file exchange or the like.

The Second Embodiment

In the first embodiment, the case where copyright management and payment management in a primary circulation of a content are performed by a content distribution management device was explained. In the second embodiment, the case where copyright management and payment management in a secondary circulation of a content are performed by a content distribution management device will be explained.

Note that an explanation of the configuration which is similar to that of the first embodiment will be omitted, and instead, the configuration which is peculiar to the second embodiment will be focused on.

FIG. 7 is a block diagram showing a functional configuration of each device in a content distribution management system 20 according to the second embodiment, in which how communication is performed between each device in a secondary circulation of a content is illustrated. More specifically, FIG. 7 is a diagram showing the case where the content distributing device B 13 receives an encrypted content in a secondary circulation from the content distributing device A 11 which obtained the content in a primary circulation (purchased or non-purchased). Although the functional configuration of the content distributing device B 13 is newly illustrated in FIG. 7, it is basically the same as that of the content distributing device A 11 in the above-described first embodiment. Note that the content distributing device A 11 in FIG. 7 also has the functions of the content providing device 1 in the first embodiment. Further, when a non-purchased content is purchased in a secondary circulation, the content distribution management device 17 allocates an intermediary fee to an intermediary of the content, and collects a management fee from at least one of a provider, an intermediary and a purchaser of the content. The content distribution management device 17 can, of course, collect the management fee from plural one or all of the provider, intermediary and purchaser. When a content is provided by the content providing device 1, intermediated by the content distributing device A 11, and then purchased by the content providing device B 13, for example, the content distribution management device 17 allocates an intermediary fee to the content distributing device A 11, and collects a management fee from the content providing device 1 and the content distributing device B 13.

Figure 8:
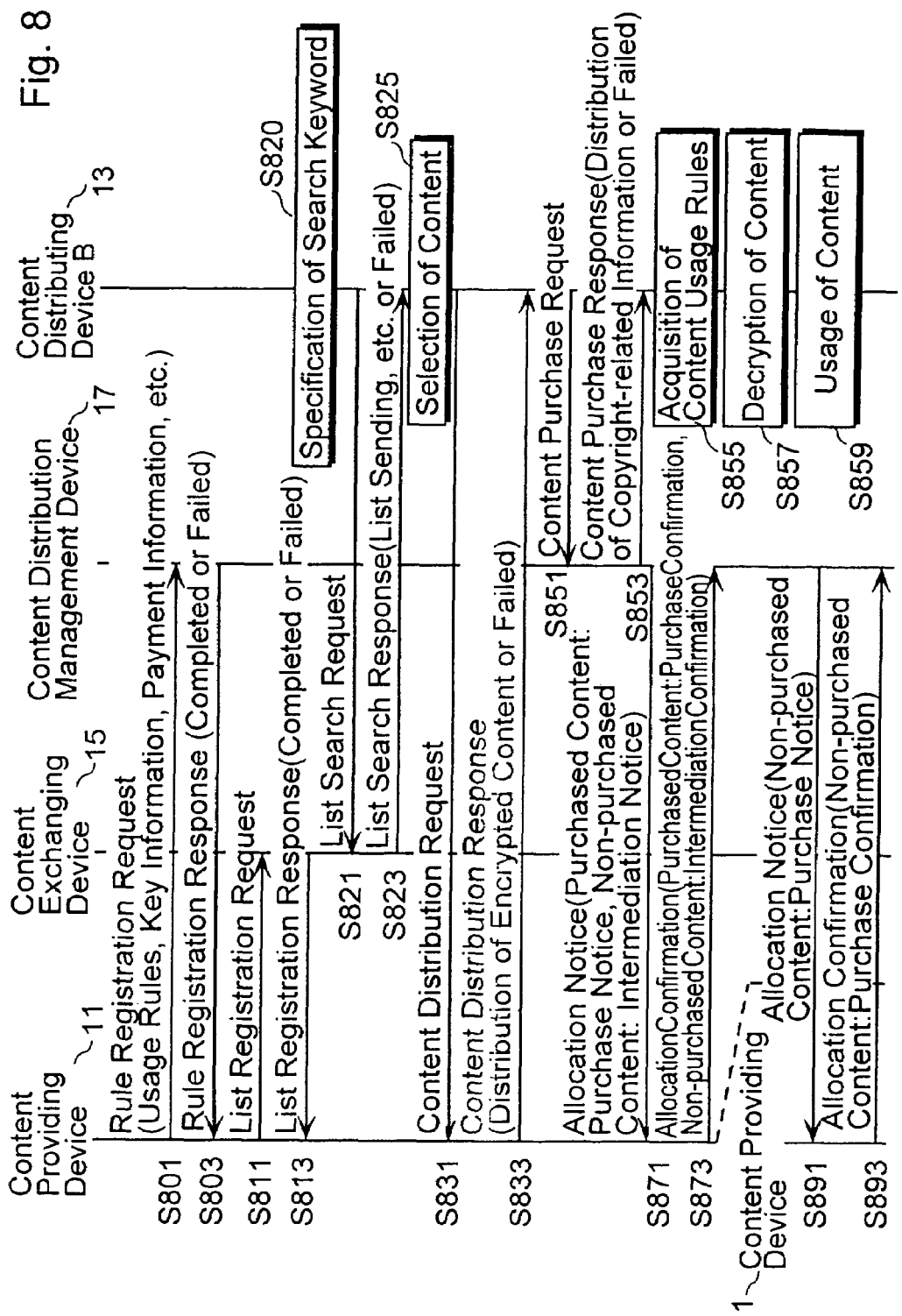
FIG. 8 is a diagram of a communication sequence in the case where a purchased content and a non-purchased content are in a secondary circulation.

FIG. 8 is a diagram of a communication sequence in the case where a purchased content and a non-purchased content according to the second embodiment are in a secondary circulation. Here, "a purchased content" means an encrypted content that can be decrypted because payment processing was performed between a content distributing device and a content distribution management device, and "a non-purchased content" means an encrypted content that can not be decrypted because payment processing was not performed between a content distributing device and a content distribution management device.

The communication sequence of FIG. 8 is different from that of FIG. 4 in that an intermediation notice that an intermediary fee will be allocated from the content distribution management device 17 to the content distributing device A 11 is added, when the content distributing device B 13 purchased a content through the intermediation of the content distributing device A 11. Note that when the content distributing device B 13 secondarily circulates a content which was purchased by the content distributing device A 11 in a primary circulation, the communication sequence of FIG. 8 is the same as that of FIG. 4 where a content is primarily circulated from the content providing device 1 to the content distributing device A 11 in the first embodiment.

Figure 9:
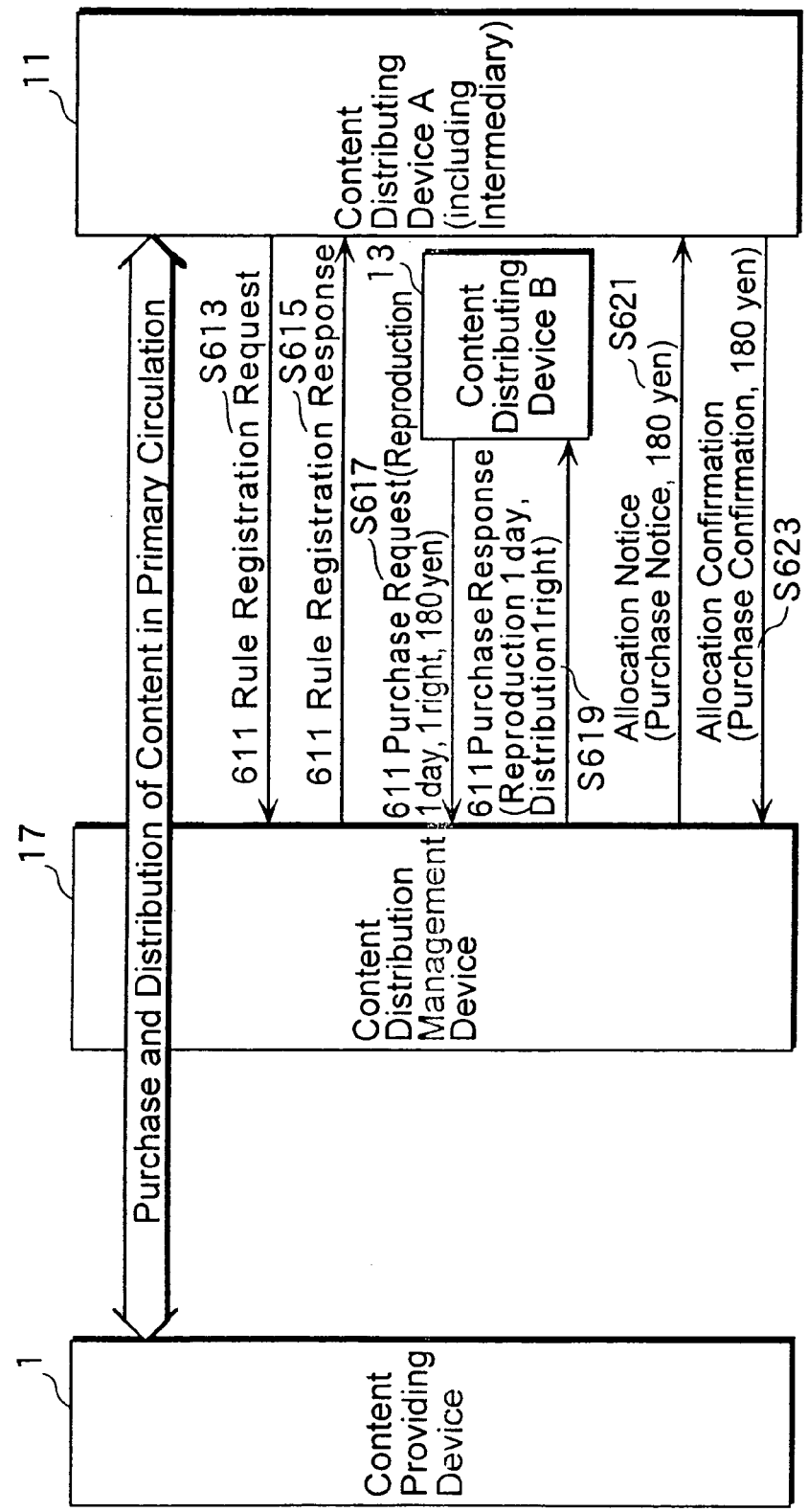
FIG. 9 is a diagram showing a detailed example of information which is communicated between each device with a content distribution management device as a center in the case where a content distributing device A secondarily circulates a content which is purchased from a content providing device further to a content distributing device B.

FIG. 9 is a diagram showing a detailed example of information which is communicated between each device with the content distribution management device 17 as a center in the case where the content distributing device A 11 secondarily circulates a content which was purchased from the content providing device 1 further to the content distributing device B 13. Note that in FIG. 9, communication of information in a primary circulation and a content distribution processing from the content distributing device A 11 to the content distributing device B 13 in a secondary circulation are omitted.

FIGS. 10A-10D are examples showing how details of a management information table 600 which is managed in the content distribution management device 17 change in the case where a content is purchased in a primary circulation and further circulated secondarily.

FIG. 11 is an example of a table showing a circulation history of a content. In the table of FIG. 11, addresses of distributor devices are registered per content ID that can specify contents uniquely, for example, in order of the earliness of time that the contents were purchased via the distributor devices. This table makes a history of content purchasers (devices) clearer, and it also becomes possible to allocate purchase charges more carefully based on this table.

Figure 12:
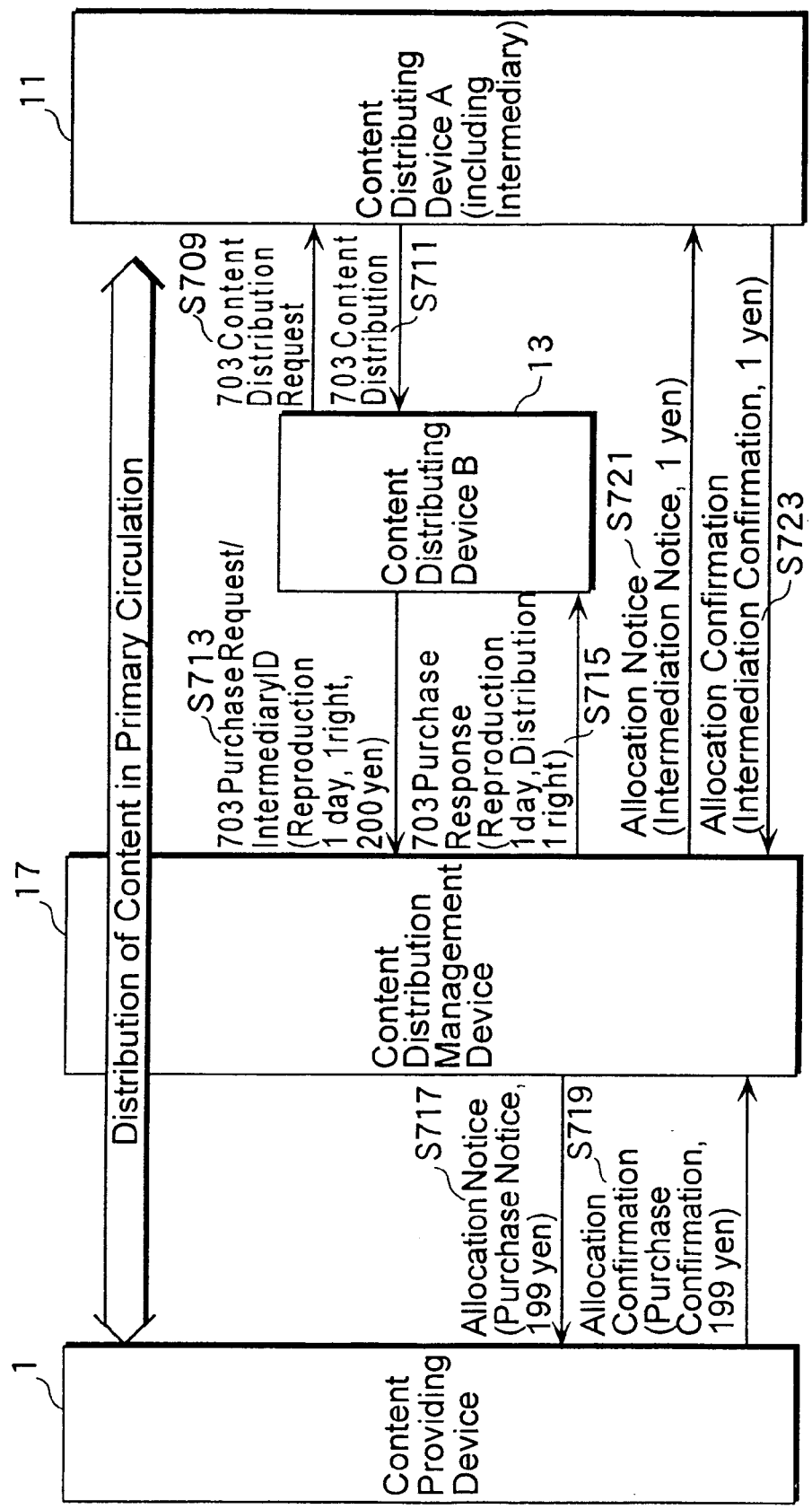
FIG. 12 is an example of how communication is specifically performed in a content distribution management device 17 in the case where a non-purchased content that was distributed in a primary circulation is secondarily circulated.

FIG. 12 is an example showing how communication is specifically performed in the content distribution management device 17 in the case where a non-purchased content that was distributed in a primary circulation is secondarily circulated. Note that communication in the primary circulation is omitted in FIG. 12.

FIGS. 13A, 13B are examples showing how details of a management information table 700 which is managed in the content distribution management device 17 change in the case where a non-purchased content is secondarily circulated.

Methods of copyright management and payment management in the case of a secondary circulation of a content in the content distribution management device 17, as shown in FIG. 7, will be explained below with reference to FIG. 7-FIG. 13.

(19) The content distributing device A 11 purchases a content A 601 according to the procedures which are similar to those of the first embodiment mentioned above (similar to Step S501-Step S515 in FIG. 5). Further, the content distributing device A 11 sends a rule registration request of a content A 611 which is distributable to other content distributing devices via the network 19 to the content distribution management device 17 (Step S801). This corresponds to the processing of a 611 rule registration request (Step S613) in FIG. 9. This corresponds to the case where a user of the content distributing device A 11 offers a content A with the remaining number of rights of 3 for sale, or secondhand sale of a content, as shown in FIG. 10C.

(20) The content distribution management device 17 checks the details of the rule registration request which is received from the content distributing device A 11, and sends a rule registration response of "failed" to the content distributing device A 11 when the request is unacceptable (Step S803), in the same way as the above processing (2). The content distributing device A 11 re-performs the processing of (19) above and the following after the factors of the problem of being "failed" are tracked down and the appropriate measures are taken, in the same way as the above processing (2).

(21) The content distribution management device 17 receives the rule registration request from the content distributing device A 11 (Step S801), and when the content distribution management device 17 it decides that the rule registration request is acceptable, the content distribution management device 17 sends a rule registration response of "completed" to the content distributing device A 11 (Step S803). The content distributing device A 11 receives the rule registration response "completed", and then performs the processing of (22) below and the following. This corresponds to the processing of a 611 rule registration response (Step S615) in FIG. 9. As a result, the content distribution management device 17 revises the description in the "payment information" column of the content A 611 in the management information table 600 from "not for sale" to "180 yen/right", as shown in FIG. 10C, in order to indicate that the content can be purchased under the rule of 180 yen per right for 1 day.

(22) The content distributing device A 11 sends a registration request of a list of contents which are distributable to other content distributing devices via the network 19 to the content exchanging device 15 (Step S811).

(23) The content exchanging device 15 checks details of the list registration request which is received from the content distributing device A 11, and sends a list registration response of "failed" to the content distributing device A 11 when the request is unacceptable (Step S813), in the same way as the above processing (5). The content distributing device A 11 re-performs the processing of (22) above and the following after the factors of the problem contributing to the "failed" response are tracked down and the appropriate measures are taken, in the same way as the above processing (5).

(24) The content exchanging device 15 receives the list registration request from the content distributing device A 11, and sends a list registration response of "completed" to the content distributing device A 11 when this request is acceptable (Step S813), in the same way as the processing (6) above. The content distributing device A 11 receives the list registration response "completed", and then performs the processing of (25) below and the following.

(25) The content distributing device B 13 specifies a search keyword (Step S820), and sends a search request of a list of contents which a user desires to acquire via the network 19 to the content exchanging device 15 (Step S821), in the same way as the processing (7) above.

(26) The content exchanging device 15 checks the details of the list search request which is received from the content distributing device B 13, and sends a list search response of "failed" to the content distributing device B 13 when the request is unacceptable (Step S823), in the same way as the above processing (8). The content distributing device B 13 re-performs the processing of (25) above and the following after the factors of the problem contributing to the "failed" response are tracked down and the appropriate measures are taken, in the same way as the above processing (8).

(27) The content exchanging device 15 receives the list search request from the content distributing device B 13, and sends a list search response of "completed" as well as the list to the content distributing device B 13 when this request is acceptable (Step S823), in the same way as the processing (9) above. The content distributing device B 13 receives the list search response "completed", and then performs the processing of (28) below and the following.

(28) The content distributing device B 13 selects a content that meets desired usage rules among the received list (Step S825).

(29) The content distributing device B 13 sends a content distribution request to the content distributing device A 11 (Step S831). This corresponds to the processing of a 703 content distribution request (Step S709) in FIG. 12.

(30) The content distributing device A 11 checks the details of the content distribution request which is received from the content distributing device B 13, and sends a content distribution response of "failed" to the content distributing device B 13 when the request is unacceptable (Step S833), in the same way as the above processing (12). The content distributing device B 13 re-performs the processing of (29) above and the following after the factors of the problem contributing to the "failed" response are tracked down and the appropriate measures are taken, in the same way as the above processing (12).

(31) The content distributing device A 11 receives the content distribution request from the content distributing device B 13, and sends a content distribution response of "completed" as well as the non-purchased content or the purchased content to the content distributing device B 13 when this request is acceptable (Step S833), in the same way as the processing (13) above. The content distributing device B 13 receives the content distribution response "completed", and then performs the processing of (32) below and the following. This corresponds to the processing of a 703 content distribution (Step S711) in FIG. 12.

(32) By an operation of a user of the content distributing device B 13, a content purchase request is sent via the network 19 from the user interface unit 131 of the content distributing device B 13 to the content distribution management device 17 in order to purchase a content (Step S851). This corresponds to the processing of a 611 purchase request (reproduction 1 day, 1 right, 180 yen) (Step S617) in FIG. 9, and the processing of a 703 purchase request (reproduction 1 day, 1 right, 200 yen) (Step S713) in FIG. 12, respectively.

(33) The content distribution management device 17 checks the details of the request which is received from the content distributing device B 13, and sends a content purchase response of "failed" to the content distributing device B 13 when the request is unacceptable (Step S853), in the same way as the above processing (15). The content distributing device B 13 re-performs the processing of (32) above and the following after the factors of the problem contributing to the "failed" response are tracked down and the appropriate measures are taken, in the same way as the above processing (15).

(34) The content distribution management device 17 receives the purchase request from the content distributing device B 13, and sends a purchase response of "completed" as well as the copyright-related information to the content distributing device B 13 when this request is acceptable (Step S853), in the same way as the processing (16) above. The content distributing device B 13 receives the purchase response "completed", and then performs the processing of (35) below and the following. This corresponds to the processing of a 611 purchase response (reproduction 1 day, distribution 1 right) (Step S619) in FIG. 9, and the processing of a 703 purchase response (reproduction 1 day, distribution 1 right) (Step S715) in FIG. 12, respectively.

The copyright management processing unit 173 of the content distribution management device 17 revises the number of rights of the content A 611 in the management information table 600 from "3" to "2", as shown in FIGS. 10C and 10D.

On the other hand, in the case of a non-purchased content, the number of rights of the content A 703 in the management information table 700 is reduced from "100,000" to "99,999", as shown in FIG. 13. Also, a column for a content A 711 is added to the management information table 700, and "1" is described for the number of rights. In this case, the content distribution management device 17 acquires a management fee for right movement (1 yen, for example) as a profit from the content providing device 1, the content distributing device A 11 or the content distributing device B 13.

(35) The content distribution management device 17 sends an allocation notice (an intermediation notice in the case of intermediating the non-purchased content, and a purchase notice in the case of intermediating the purchased content) to the content distributing device A 11 (Step S871). This corresponds to the processing of an allocation notice (purchase notice, 180 yen) (Step S 621) in FIG. 9, and the processing of an allocation notice (intermediation notice, 1 yen) (Step S721) in FIG. 12, respectively.

(36) The content distributing device A 11 receives the allocation notice (the intermediation notice in the case of intermediating the non-purchased content, and the purchase notice in the case of intermediating the purchased content) from the content distribution management device 17, and then sends an allocation confirmation (an intermediation confirmation in the case of intermediating the non-purchased content, and a purchase confirmation in the case of intermediating the purchased content) to the content distribution management device 17 (Step S873). This corresponds to the processing of an allocation confirmation (purchase confirmation 180 yen) (Step S623) in FIG. 9, and the processing of an allocation confirmation (intermediation confirmation 1 yen) (Step S723) in FIG. 12, respectively.

(37) When the non-purchased content was intermediated, the content distribution management device 17 sends an allocation notice (a purchase notice) to the content providing device 1 which provided the content (Step S891). This corresponds to the processing of an allocation notice (purchase notice, 199 yen) (Step S717) in FIG. 12. In this case, as shown in FIG. 12, the amount of charge that is allocated to the content providing device 1 is reduced according to an intermediary allocation rate (1 yen/right [0.5%]).

(38) The content providing device 1 receives the allocation notice (purchase notice) from the content distribution management device 17, and then sends an allocation confirmation (a purchase confirmation) to the content distribution management device 17 (Step S893). This corresponds to the processing of the allocation confirmation (purchase confirmation, 199 yen) (Step S723) in FIG. 12.

Figure 14:
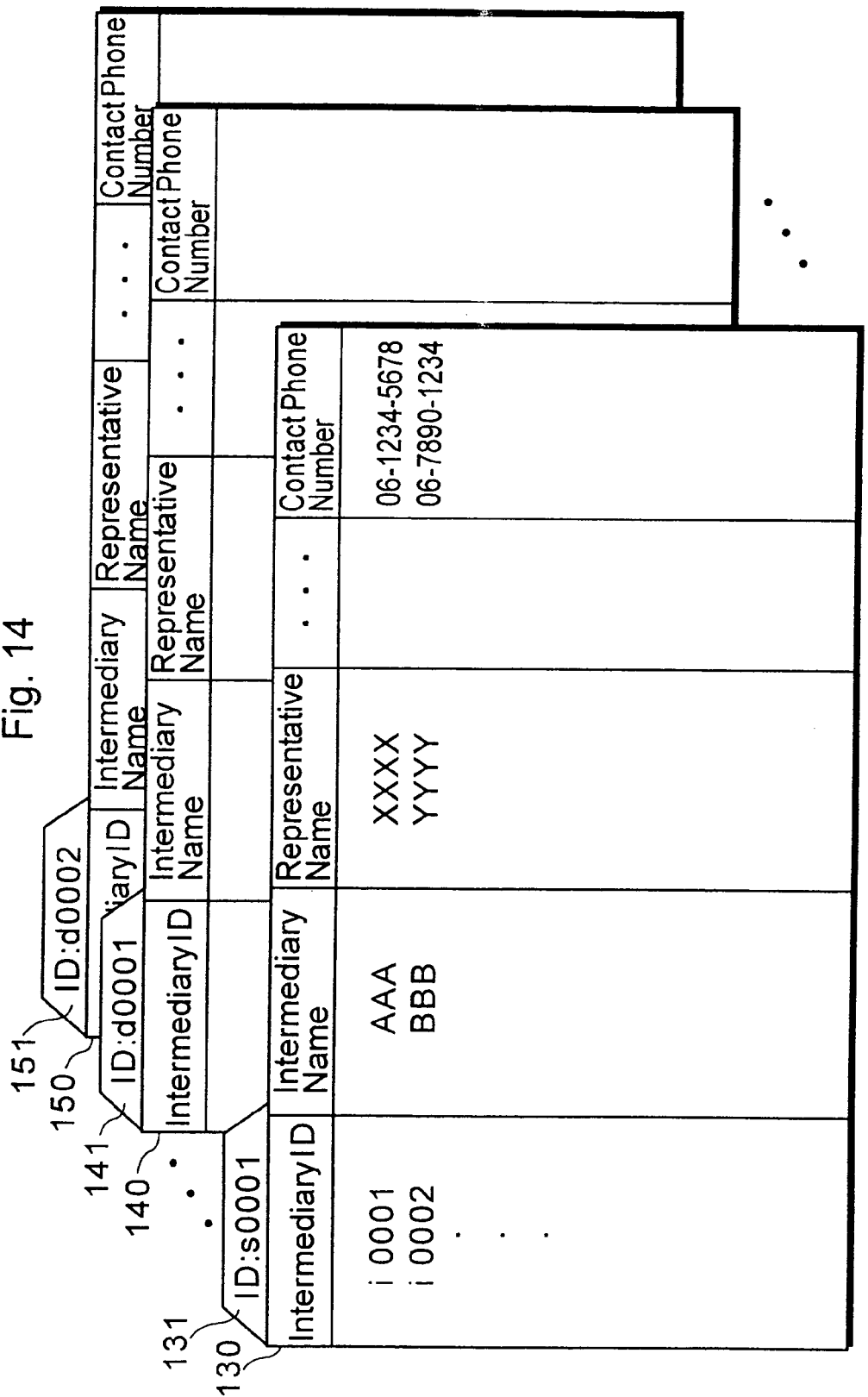
FIG. 14 shows lists of data regarding intermediaries which are registered corresponding to IDs of devices such as a content providing device and a content distributing device.

FIG. 14 shows lists of data regarding intermediaries registered corresponding to IDs of devices such as the above content providing device and the content distributing devices. Note that these device IDs are defined uniquely by the above addresses. These lists are registered in the memory unit 179 of the content distribution management device 17. These lists 130, 140, 150 are used for preventing a content from being purchased by a dishonest intermediary.

As for the content providing device 1 whose device ID is "s0001", for example, information such as an "intermediary ID" and an "intermediary name" of an intermediary that is authorized by the content providing device 1 is registered.

FIG. 15 is a flowchart showing a flow of payment allocation processing among payment processing in the content distribution management device 17.

First, when the content distribution management device 17 receives a purchase request (Step S1401), the content management device 17 checks whether or not the content purchase request includes an intermediary ID or not (Step S1402). When the intermediary ID is included, the content distribution management device 17 judges that a non-purchased content was intermediated. When the intermediary ID of the content is identical with the intermediary ID which is registered in the memory unit 179, the content distribution management device 17 allocates an intermediary fee to the intermediary, and allocates a purchase charge to the distributor of the content (Steps S1406, 1403, 1404).

On the other hand, when the intermediary ID is not included, the content distribution management device 17 judges that a purchased content was further purchased, and allocates the purchase charge to the distributor of the content (Steps S1403, 1404).

As described above, it becomes possible to prevent copyright infringements which are caused by an illegitimate file exchange or the like by building the system for managing the distribution of an encrypted content separately from copyright management and payment management, regardless of a purchased or a non-purchased content, even when the content is secondarily circulated.

Note that although the content exchanging device 15 is different from the content distribution management device 17 in the above embodiments, the configuration in which both the content exchanging device 15 and the content distribution management device 17 are realized in the same device is also included in the present invention. Further, the configuration in which the content distributing devices A 11 and B 13, the content exchanging device 15 and the content distribution management device 17 are realized in the same device is also included in the present invention.

On the other hand, since the content providing device 1 is not specifically distinguished from the content distributing devices A 11 and B 13 from a functional viewpoint, the content providing device 1 can be considered to be a kind of a content distributing device. Therefore, it is obvious that each user of each content distributing device may be a content provider.

What is claimed is:

1. A content distribution management system that circulates a content via a network that includes a plurality of communication terminal devices that exchange the content on the network, a distribution management device that performs copyright management of the content and payment management concerning usage of the content, and a communication exchange device that provides information regarding the circulation of the content to the communication terminal device, the system comprising:

at least one communication terminal device that includes:
        a content receiving unit that receives a content from another communication terminal device, the content being one of a primary circulated content and a secondary circulated content;
        a content acquisition processing unit that sends, to said distribution management device, purchase requesting information requesting purchase of the received content;
        a content storage processing unit that receives, from the distribution management device, rights information for enabling, under a certain rule, usage of the content which is requested to be purchased;
        said content acquisition processing unit that also sends information regarding a search to the communication exchange device, receives result information regarding a predetermined search item from the communication exchange device, and specifies a content and a communication terminal device which is a distributor of the content based on the received result information, and sends, to the specified communication terminal device which is the distributor of the content, information for requesting the sending of the specified content;
        said content storage processing unit that also uses the content which is requested to be purchased according to the rights information received by the rights information receiving unit; and sends, to the distribution management device, a rule registration request for requesting registration of a usage rule of one of the primary circulated content and the secondary circulated content, which is to be distributed; and
    a sending unit that sends the content received by the content receiving unit to another communication terminal device,
        wherein said content acquisition processing unit sends a search condition to the communication exchange device, receives a predetermined search list from the communication exchange device, weights an attribute information indicating a characteristic of each of the content which is attached to the received search list, compares the content based on the attribute information, and specifies a most weighted content and a communication terminal device which is a distributor of the most weighted content, and specifies one of said communication terminal device that requests the sending of content and said another communication terminal device as a destination of the specified content, and sends the requesting information to the specified communication terminal device, and
        wherein said content storage processing unit further includes a usage request processing unit that sends usage requesting information for requesting usage of a purchased content to the distribution management device, and receive usage licensing information for licensing the usage from the distribution management device, and said content storage processing unit uses the content based on the usage licensing information;

the communication exchange device includes:
        a search responding unit that receives the information regarding the search from a communication terminal device, determines the result information regarding the search based on the received information, and sends the result information to the communication terminal device sending the information regarding the search; and the distribution management device includes:
        a memory unit that stores information regarding copyright management information and payment management information such that the copyright management information and the payment management information are associated with individual content, the copyright management information including a number of rights representing how many times the content is usable under a certain rule, and the payment management information including payment information indicating one of a payment amount for each of the rights that are purchased and information indicating that the rights are not purchased;
        a rights information sending unit that specifies rights information according to one of the purchase requesting information received by the communication terminal device and the copyright management information that is specified based on the rule registration request, and sends the specified rights information to a predetermined communication terminal device; and
        a payment management processing unit that updates the copyright management information and the payment management information based on one of the purchase requesting information and the rule registration request,
        wherein the updating is performed by decreasing, by a number of rights which are purchased, the number of the rights in the memory unit regarding the content for which the purchase requesting information is sent, and registering, in the memory unit, payment information indicating the number of the rights which are purchased and the information indicating that the rights are not purchased, when the purchased content which is purchased according to the purchase requesting information, and the purchase requesting information is received from the communication terminal device, and the updating is performed by updating the payment information in the memory unit regarding the content for which the rule registration request is sent, from the information indicating that the rights are not purchased, to the payment amount for each of the rights, when the rule registration request is received from the communication terminal device.

2. A distribution management device used in a content distribution management system that circulates a content via a computer network, said content distribution management system including a plurality of communication terminal devices that exchange the content on the network, a distribution management device that performs copyright management of the content and payment management concerning usage of the content, and a communication exchange device that provides information regarding the circulation of the content to the communication terminal device, the distribution management device comprising:

a memory unit that stores copyright management information and payment management information such that the copyright management information and the payment management information are associated with individual content, the copyright management information including a number of rights representing how many times the content is usable under a certain rule, and the payment management information including payment information indicating one of a payment amount for each of the rights that the rights are purchased and information indicating when rights are not purchased;

a rights information sending unit that specifies rights information according to one of (i) purchase requesting information received by the communication terminal device, the purchase request information requesting purchase of one of a primary circulated content and a secondary circulated content and (ii) the copyright management information that is specified based on a rule registration request indicating a usage rule of the one of the primary circulated content and the secondary circulated content, and sends the specified rights information to a predetermined communication terminal device; and a payment management processing unit that updates the copyright management information and the payment management information based on one of the purchase requesting information and the rule registration request, wherein the updating is performed by decreasing, by a number of rights which are purchased, the number of the rights in the memory unit regarding the content for which the purchase requesting information is sent, and registering, in the memory unit, payment information indicating the number of the rights which are purchased and the information indicating that the rights are not purchased, when the purchased content which is purchased according to the purchase requesting information, and the purchase requesting information is received from the communication terminal device, and wherein the updating is performed by updating the payment information in the memory unit regarding the one of the primary circulated content and the secondary circulated content for which the rule registration request is sent, from the information indicating that the rights are not purchased, to the payment amount for each of the rights, when the rule registration request is received from the communication terminal device.

3. A communication terminal device used in a content distribution management system that circulates a content via a computer network, said content distribution management system including a plurality of the communication terminal devices that exchange the content on the network, a distribution management device that performs copyright management of the content and payment management concerning usage of the content, and a communication exchange device that provides information regarding the circulation of the content to the communication terminal device, the communication terminal device comprising:

a content receiving unit that receives a content from another communication terminal device, the content being one of a primary circulated content and a secondary circulated content;

a content acquisition processing unit that sends purchase requesting information for requesting purchase of the received content to the distribution management device;

a content storage processing unit that receives, from the distribution management device, rights information for enabling, under a certain rule, usage of the content which is requested to be purchased;

said content acquisition processing unit that also sends information regarding a search to, the communication exchange device, receive result information regarding a predetermined search item from the communication exchange device, and specifies a content and a communication terminal device which is a distributor of the content based on the received result information; and sends, to the specified communication terminal device which is the distributor of the content, requesting information for requesting the sending of the specified content;

said content storage processing unit that uses the content which is requested to be purchased according to the rights information received by the rights information receiving unit; and sends, to the distribution management device, a rule registration request for requesting registration of a usage rule of one of the primary circulated content and the secondary circulated content which is to be distributed; and a sending unit that sends the content received by the content receiving unit to another communication terminal device, wherein said content acquisition processing unit sends a search condition to the communication exchange device, receive a predetermined search list from the communication exchange device, weights an attribute information indicating a characteristic of each of the content which is attached to the received search list, compares the content based on the attribute information, and specifies a most weighted content and a communication terminal device which is a distributor of the most weighted content, and wherein said content acquisition processing unit specifies one of a communication terminal device making the request to send content and another communication terminal device as a destination of the specified content, and sends the sending requesting information to the specified device, and the content using unit further includes a usage request processing unit that sends usage requesting information for requesting usage of a purchased content to the distribution management device, and receives usage licensing information for licensing the usage from the distribution management device, and the content using unit uses the content based on the usage licensing information.

4. A content distribution management method managing distribution of a content, the method used in a content distribution management system that circulates the content via a computer network, and said content distribution management system including a plurality of communication terminal devices that exchange the content on the network, a distribution management device that performs copyright management of the content and payment management concerning usage of the content, and a communication exchange device that provides information regarding the circulation of the content to the communication terminal device, the distribution management device including a memory unit that stores copyright management information and payment management information such that the copyright management information and payment management information are associated with individual content, the copyright management information including a number of rights representing how many times the content is usable under a certain rule, and the information regarding the payment management including payment information indicating one of a payment amount for each of the rights that the rights that are purchased and information indicating that the rights are not purchased, the method comprising:

by a communication terminal device:

receiving a first content from, the content being one of a primary circulated content and a secondary circulated content;

sending purchase requesting information for requesting purchase of the first content received, the purchase requesting information being sent to the distribution management device;

receiving, from the distribution management device, rights information for enabling, under a certain rule, usage of the first content which is requested to be purchased;

sending information regarding a search to the communication exchange device, receiving result information regarding a predetermined search item from the communication exchange device, and specifying a second content and a communication terminal device which is a distributor of the second content based on the received result information; and sending, to the specified communication terminal device which is the distributor of the specified content, requesting information for requesting sending of the specified second content;

using the first content which is requested to be purchased according to the rights information received in the receiving of the rights information;

sending, to the distribution management device, a rule registration request for requesting registration of a usage rule of one of a primary circulated content and a secondary circulated content, which is to be distributed; and sending the first content received in the receiving of the first content to another communication terminal device, wherein the sending of the information regarding the search, the receiving of the result information, and the specifying the second content and the distributor of the second content are performed by sending a search condition to the communication exchange device, receiving a predetermined search list from the communication exchange device, weighting an attribute information indicating a characteristic of each of the content which is attached to the received search list, comparing the content based on the attribute information, and specifying a most weighted content and a communication terminal device which is a distributor of the most weighted content, and wherein the sending of the requesting information is performed by specifying one of a communication terminal device making the request and a communication terminal device as a destination of the specified content, and sending the requesting information to the specified communication terminal device, and the using of the first content further includes sending usage requesting information for requesting usage of a purchased first content to the distribution management device, receiving usage licensing information for licensing the usage from the distribution management device, and using the first content based on the usage licensing information;

by the communication exchange device:

receiving the information regarding the search from the communication terminal device, making the result information regarding the search based on the received information, and sending the result information to the communication terminal device that is the sender of the information regarding the search; and by the distribution management device:

specifying rights information according to one of the purchase requesting information received by the communication terminal device and the copyright management information that is specified based on the rule registration request, and sending the specified rights information to a predetermined communication terminal device; and updating the copyright management information and the payment management information based on one of the purchase requesting information and the rule registration request, wherein the updating is performed by decreasing, by a number of rights which are purchased, the number of the rights in the memory unit regarding the first content for which the purchase requesting information is sent, and registering, in the memory unit, payment information indicating the number of the rights which are purchased and the information indicating that the rights are not purchased, when the purchased first content which is purchased according to the purchase requesting information, and the purchase requesting information is received from the communication terminal device, and the updating is performed by updating the payment information in the memory unit regarding the first content for which the rule registration request is sent, from the information indicating that the rights are not purchased, to the payment amount for each of the rights, when the rule registration request is received from the communication terminal device.

5. A distribution management method managing content distribution, the method being used in a distribution management device in a content distribution management system that circulates a content via a computer network, said content distribution management system including a plurality of communication terminal devices that exchange the content on the network, the distribution management device that performs copyright management of the content and payment management concerning usage of the content, and a communication exchange device that provides information regarding the circulation of the content to the communication terminal device, the distribution management device including a memory unit that stores copyright management information and payment management information such that the copyright management information and the payment management information are associated with individual content, the copyright management information including a number of rights representing how many times the content is usable under a certain rule, and the payment management information including payment information indicating one of a payment amount for each of the rights that the rights indicated by the number of the rights are purchased and information indicating that the rights are not purchased, the method comprising:

by the distribution management device:

specifying rights information according to one of (i) purchase requesting information received by the communication terminal device, the purchase request information requesting purchase of one of a primary circulated content and a secondary circulated content and (ii) the copyright management information that is specified based on a rule registration request indicating a usage rule of the one of the primary circulated content and the secondary circulated content, and sending the specified rights information to a predetermined communication terminal device; and updating the information regarding the copyright management information and the payment management information based on one of the purchase requesting information and the rule registration request, wherein the updating is performed by decreasing, by a number of rights which are purchased, the number of the rights in the memory unit regarding the content for which the purchase requesting information is sent, and registering, in the memory unit, payment information indicating the number of the rights which are purchased and the information indicating that the rights are not purchased, when the purchased content which is purchased according to the purchase requesting information, and the purchase requesting information is received from the communication terminal device, and the updating is performed by updating the payment information in the memory unit regarding the one of the primary circulated content and the secondary circulated content for which the rule registration request is sent, from the information indicating that the rights are not purchased, to the payment amount for each of the rights, when the rule registration request is received from the communication terminal device.

\* \* \* \* \*